United States Patent
Lu et al.

(10) Patent No.: US 12,292,089 B2
(45) Date of Patent: May 6, 2025

(54) PDM TRANSMISSION WITH ARTICULATED TORQUE TRANSFER

(71) Applicant: Abaco Drilling Technologies LLC, Houston, TX (US)

(72) Inventors: Jing Lu, Houston, TX (US); Peter Thomas Cariveau, Houston, TX (US); Damon T. Landrum, Spring, TX (US); Steven C. Gaare, New Caney, TX (US)

(73) Assignee: Abaco Drilling Technologies LLC, Houston, TX (US)

( * ) Notice: Subject to any disclaimer, the term of this patent is extended or adjusted under 35 U.S.C. 154(b) by 0 days.

(21) Appl. No.: 18/322,980

(22) Filed: May 24, 2023

(65) Prior Publication Data

US 2023/0296138 A1   Sep. 21, 2023

Related U.S. Application Data

(63) Continuation of application No. 16/797,178, filed on Feb. 21, 2020, now Pat. No. 11,661,972.

(60) Provisional application No. 62/808,709, filed on Feb. 21, 2019.

(51) Int. Cl.
| | |
|---|---|
| *F16D 3/18* | (2006.01) |
| *F16D 3/22* | (2006.01) |
| *E21B 17/05* | (2006.01) |
| *F16D 3/221* | (2006.01) |

(52) U.S. Cl.
CPC .............. *F16D 3/185* (2013.01); *F16D 3/22* (2013.01); *E21B 17/05* (2013.01); *F16D 3/221* (2013.01)

(58) Field of Classification Search
CPC . F16D 3/185; F16D 3/22; F16D 3/221; E21B 17/05
See application file for complete search history.

(56) References Cited

U.S. PATENT DOCUMENTS

| | | | |
|---|---|---|---|
| 1,112,869 | A | 10/1914 | Tirrell |
| 1,331,775 | A | 2/1920 | Lavigne |
| 1,625,511 | A | 4/1927 | Ungerer |
| 2,760,359 | A | 8/1956 | Wildhaber |
| 3,257,826 | A | 6/1966 | Peterson |
| 4,565,541 | A | 1/1986 | Obrecht |
| 4,772,246 | A | 9/1988 | Wenzel |
| 5,000,723 | A | 3/1991 | Livingstone |
| 5,007,491 | A | 4/1991 | Ide |

(Continued)

FOREIGN PATENT DOCUMENTS

| | | |
|---|---|---|
| GB | 235081 | 6/1925 |
| SU | 362162 | 12/1972 |
| SU | 1434165 A1 | 10/1988 |

*Primary Examiner* — Greg Binda
(74) *Attorney, Agent, or Firm* — Zeman-Mullen & Ford, LLP

(57) ABSTRACT

A ball-CV style transmission suitable for use in a Positive Displacement Motor (PDM). A shaft provides shaft wings received into housing receptacles on a housing. A Unitary Torque Transfer Element (UTTE) is interposed between each shaft wing and housing within each housing receptacle, with a spherical surface on the UTTE received into a recess preferably on the housing. The UTTEs float within their corresponding housing receptacles so as to maintain torque transfer contact between all thrust surfaces during articulated rotation of the shaft with respect to the housing. The UTTEs preferably float generally radially towards the shaft centerline as angular deflection increases during articulated rotation.

7 Claims, 18 Drawing Sheets

(56) References Cited

U.S. PATENT DOCUMENTS

| | | |
|---|---|---|
| 5,052,501 A | 10/1991 | Wenzel et al. |
| 5,078,650 A | 1/1992 | Foote |
| 5,267,905 A | 12/1993 | Wenzel et al. |
| 5,547,032 A | 8/1996 | Wenzel |
| 5,704,838 A | 1/1998 | Teale |
| 5,954,587 A | 9/1999 | Jacob et al. |
| 6,042,479 A | 3/2000 | Hopson et al. |
| 6,949,025 B1 | 9/2005 | Kraus et al. |
| 7,186,182 B2 | 3/2007 | Wenzel et al. |
| 8,033,920 B1 | 10/2011 | Benson |
| 8,062,140 B2 | 11/2011 | Wall et al. |
| 8,215,841 B2 | 7/2012 | Wenzel |
| 8,894,497 B2 | 11/2014 | Kim |
| 8,900,062 B2 | 12/2014 | Nicol-Seto |
| 8,915,788 B2 | 12/2014 | Foote et al. |
| 9,915,106 B2 | 3/2018 | Underwood et al. |
| 10,221,894 B2 | 3/2019 | St. Pierre et al. |
| 10,316,895 B2 | 6/2019 | McMillan et al. |
| 10,408,274 B2 | 9/2019 | Marchand et al. |
| 10,975,623 B2 | 4/2021 | Sonar et al. |
| 2010/0313692 A1 | 12/2010 | Wenzel |
| 2015/0167399 A1 | 6/2015 | Kuhn et al. |
| 2016/0040484 A1 | 2/2016 | Underwood et al. |
| 2017/0045090 A1 | 2/2017 | Kuhn et al. |
| 2017/0082152 A1 | 3/2017 | LaGrange et al. |
| 2019/0162242 A1 | 5/2019 | St. Pierre et al. |
| 2019/0195286 A1 | 6/2019 | Marchand et al. |

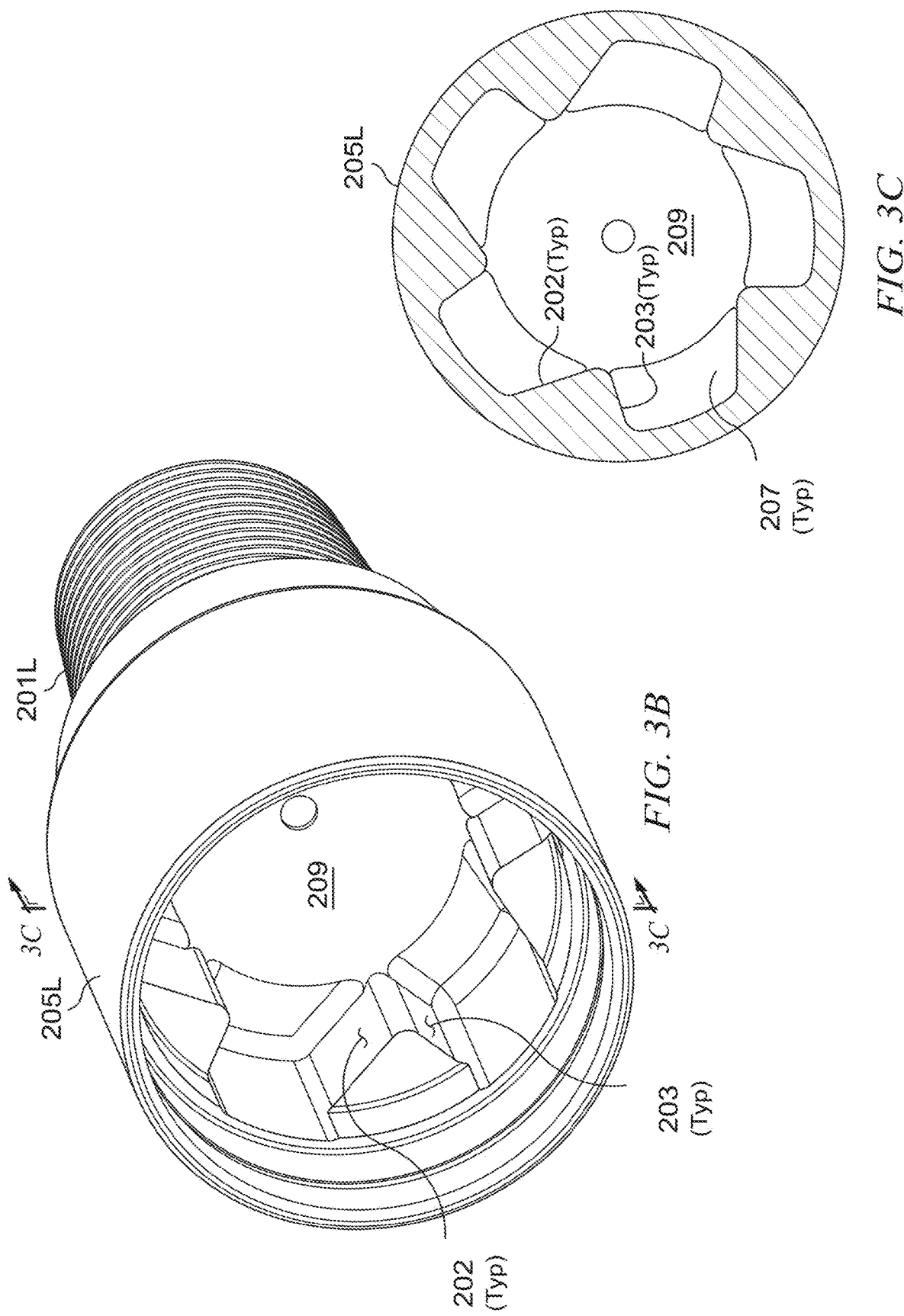

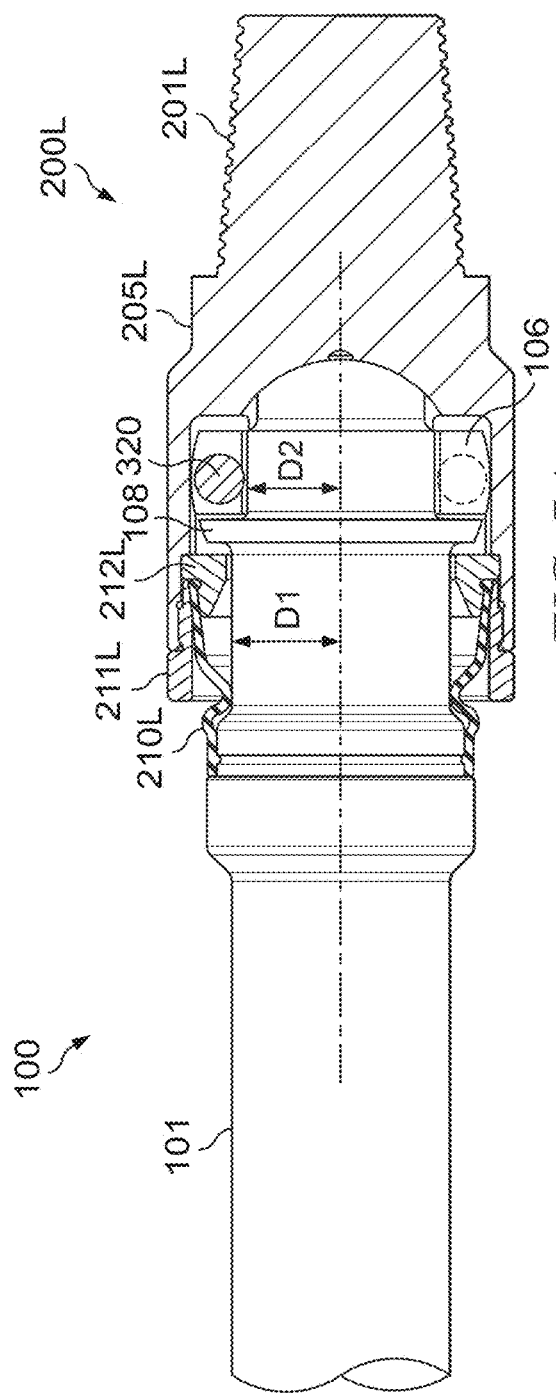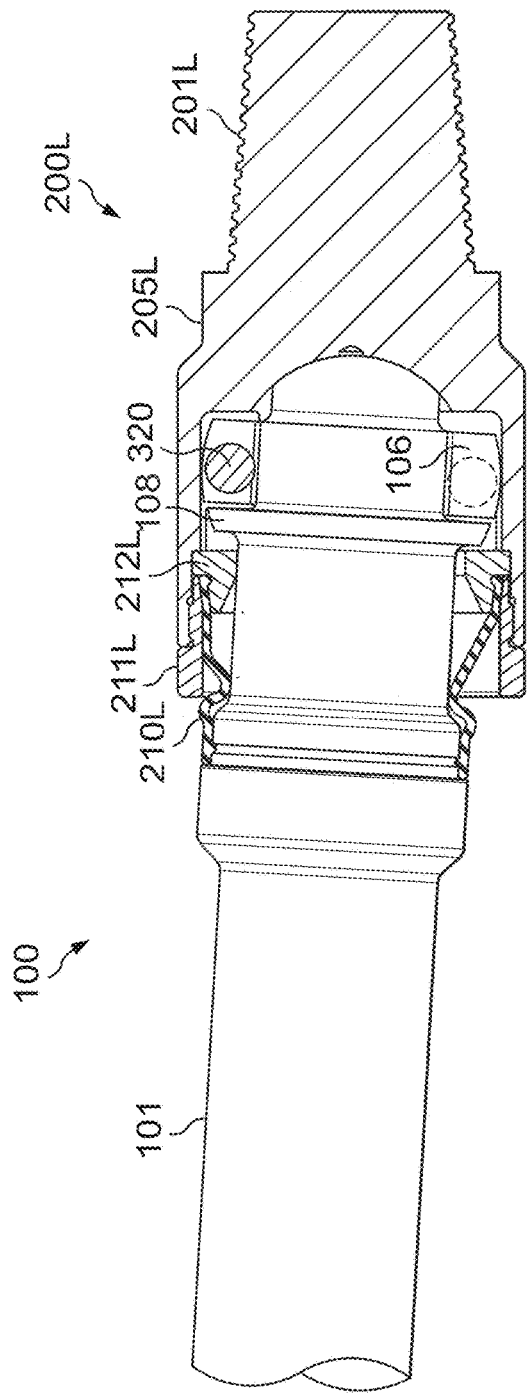
FIG. 7A
FIG. 7B

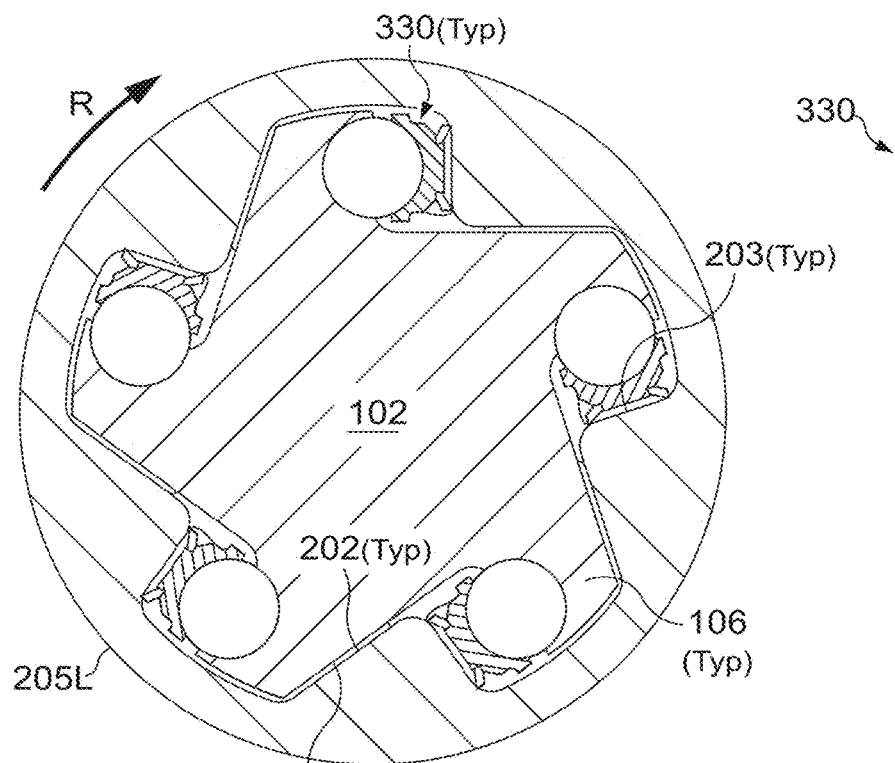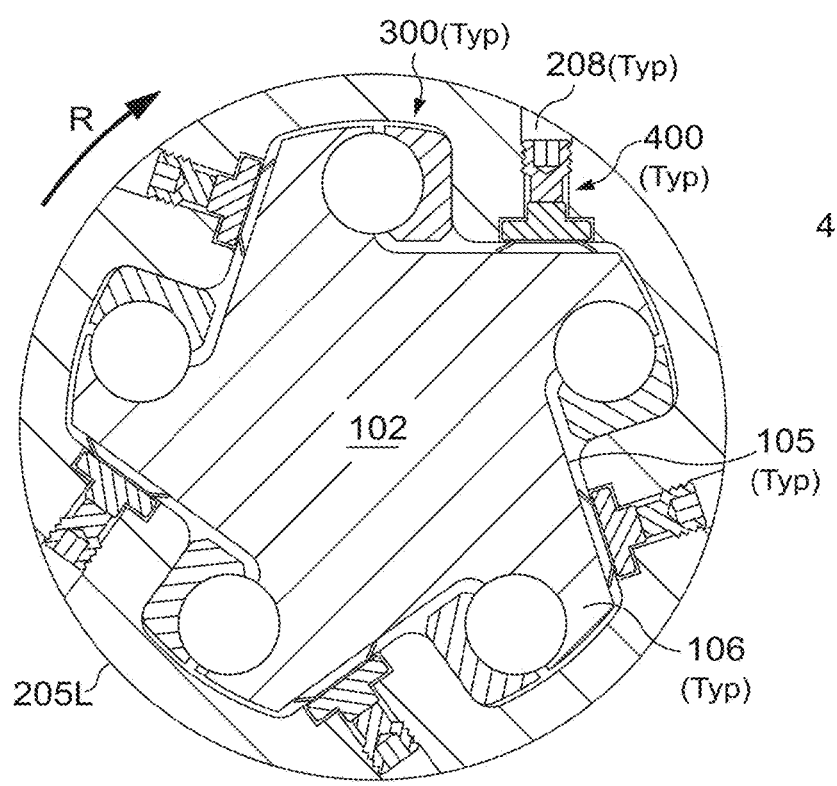

PDM TRANSMISSION WITH ARTICULATED TORQUE TRANSFER

PRIORITY CLAIM

This application is a continuation of, commonly-invented and commonly-assigned U.S. patent application Ser. No. 16/797,178 filed Feb. 21, 2020 (U.S. Pat. No. 11,661,972). Ser. No. 16/797,178 claims the benefit of and priority to commonly-owned and commonly-invented U.S. Provisional Patent Application Ser. No. 62/808,709 filed Feb. 21, 2019. The entire disclosures of Ser. Nos. 16/797,178 and 62/808,709 are incorporated herein by reference as if fully set forth herein.

FIELD OF THE DISCLOSURE

This disclosure is directed generally to rotary power transmission assemblies particularly adapted for use in bottom hole assemblies ("BHAs") in order to transfer torque generated by a subterranean positive displacement motor ("PDM") to, for example, a rotary drill bit. This disclosure is directed more specifically to such a transmission assembly transmitting torque via a ball and recessed torque transfer element ("TTE") in the style of a constant velocity ("CV") joint.

BACKGROUND

It is well understood that bottom hole assemblies ("BHAs") include rotating power shafts that are necessarily misaligned by virtue of the BHA's design. For example, the rotation of the rotor in the PDM is eccentric and not concentric. This eccentric rotation of the rotor must be resolved into concentric rotation that will ultimately rotate the bit. Further, directional drilling in deviated wellbores necessarily causes misalignment of rotating power shafts in interconnected BHA components. Directional misalignment in deviated wellbores can be as high as 3.0 degrees.

Specialized transmission sections designed for downhole applications (hereafter, "transmissions") transfer torque between such misaligned shafts. The development of increasingly high power output PDM power sections has led to the need for bearing and transmission components with higher strength and load bearing capability. A number of attempts have been made to improve the torque capability of PDM transmissions.

Woodruff key designs generally provide comparatively large Torque Transfer Elements (TTEs) whose aspect ratio is longer in the circumferential direction than in the radial or longitudinal direction. As a result, the TTEs have difficulty remaining stable within their torque transfer assembly pockets during misaligned rotation/articulation. Lack of stability, particularly in the radial direction, can unseat TTEs from their torque transfer contact during misaligned rotation. Even when in contact, such instability can cause high stress concentrations on the TTEs, similar to point loads, at locations along the contact/bearing surfaces during torque transfer. These effects are known to lead to high wear on the contact/bearing surfaces.

Bridge designs offer more stability to the TTEs by providing an aspect ratio that is shorter in the circumferential direction than in the radial or longitudinal direction. Ball/CV designs may further stabilize the TTEs by building on the bridge design concept. A plurality of balls or similar arcuate components may be interposed between the transmission shaft head and cooperating housing (in which the shaft head is received). The ball, at least in theory, provides additional freedom to allow the shaft head to "tilt" with respect to shaft head during misaligned rotation. Various such ball/CV designs are disclosed, for example, in U.S. Pat. No. 8,915,788 to Foote et al. (hereafter "Foote"). Foote discloses a ball interposed to engage a partial spherical receptacle on the drive shaft head on one side of the ball, and a partial spherical receptacle in a TTE on the other side of the ball. The TTE slides within a groove formed in the housing. The drive shaft head is further shaped in the general form of a sphere, so that the assembly imitates a general spherical/retained-sliding-ball-in-groove CV design. This design limits potential torque transfer capability. The design compels a torque transfer angle from the ball to the TTE receptacle that is less than optimal. Movement of the sliding TTE is constrained by the sides of the radial groove. The geometrical arrangement as constrained thus limits the potential mechanical advantage otherwise available to maximize the torque capability of the TTEs. Further, the Foote ball design, with its sliding TTE constrained by a radial groove in the housing, virtually ensures that at least one ball will physically disengage (unseat) from its TTE as the ball rotates off-center during misaligned rotation. Disproportional stress is then placed on the remaining engaged balls and TTEs to transfer torque. An improved design will transfer torque through the ball and TTE at a much more efficient transfer angle than is disclosed in Foote. An improved design will also reorient the sliding TTE of Foote in order to retain engagement of all balls in their respective TTEs during misaligned rotation. Reorientation of the sliding TTE will further allow the diameter of the ball to be optimized with respect to the size of its corresponding TTE. An optimized ball/TTE interface will reduce contact stress during torque transfer, allowing the improved design to transfer higher torque loads.

Other ball/CV designs are disclosed in U.S. Pat. No. 10,267,366 to LaGrange et al. (hereafter "LaGrange"). FIG. 1 is a simplified schematic illustrating articulated deflection in LaGrange. FIGS. 1A and 1B are sections as shown on FIG. 1. FIGS. 1, 1A and 1B are derived from drawings and disclosure in LaGrange. FIGS. 1A and 1B are simplified versions of FIG. 6 in LaGrange. It will be appreciated that FIGS. 1A and 1B are "mirror images" of LaGrange's FIG. 6, necessitated by the directions from which the sections are taken in FIG. 1. Where feasible, part numbers and their part names on FIGS. 1, 1A and 1B are carried over from corresponding part numbers and part names in LaGrange. Part numbers on FIGS. 1, 1A and 1B further include the prefix "L" to denote reference to LaGrange, and in distinction to part numbers referring to embodiments of new transfer technology described in this disclosure on FIGS. 2 through 11.

FIGS. 1, 1A and 1B further adopt a part number "prime" convention, where a part number without a prime notation is in an unarticulated state, and a part number with a prime notation is in an articulated state. In an unarticulated state, the part is positioned according to coaxial alignment of a shaft axis and a housing axis. In an articulated state, the part's position is deflected as a result of articulated (or misaligned) rotation of the shaft axis with respect to the housing axis.

FIG. 1 compares the relative position of force transfer element L60 with respect to socket housing L50 in an unarticulated state (per FIG. 1A) and an articulated state (per FIG. 1B). FIG. 1 depicts force transfer element L60 when crown ball centerline 34 is unarticulated, and force transfer element L60' when crown ball centerline 34' is articulated.

FIG. 1A depicts force transfer element L60 retained in socket housing relief space L58 between crown ball L40 and socket housing L50 in the unarticulated state. Socket ridge L57 on socket housing L50 cooperates with the shape of crown ball L40 to restrict force transfer element L60 from floating in socket housing relief space L58. Contact zone LC by socket housing L50 on force transfer element L60 is as illustrated on FIG. 1A in the unarticulated state.

FIG. 1B is as FIG. 1A, except in the articulated state on FIG. 1B. FIG. 1B depicts gap LG' opening between force transfer element L60' and socket housing L50 as articulation progresses. Gap LG' reduces contact zone LC on FIG. 1A to a much smaller contact zone LC' on FIG. 1B. Thus, while force transfer element L60' is likely quite stable on FIG. 1B (by virtue of physical retention by socket ridge L57, socket housing L50, and crown ball L40), the substantially reduced contact zone LC' is likely to cause high stress concentrations on force transfer element L60' and on socket housing L50 at points of contact. This will likely lead to high wear, high heat concentrations, cracking, fretting and galling on the contact/bearing surfaces.

SUMMARY OF DISCLOSED TECHNOLOGY AND TECHNICAL ADVANTAGES

Ball/CV designs consistent with this disclosure improve upon prior art ball/CV designs such as are disclosed in LaGrange. A shaft head provides shaft wings. The shaft head is disposed to be received in to a housing during misaligned rotation of the shaft with respect to the housing. A ball is interposed between a TTE and a shaft wing. The TTE is interposed between the ball and the housing. The interoperation of ball and TTE provides an additional degree of freedom in the TTE assembly. Thus, according to the position of misaligned rotation at any moment in time, the TTE may rotate and tilt about the ball in multiple axes with respect to the shaft wing during torque transfer. Components in the torque transfer flow retain a high degree of contact with one another during misaligned rotation. A smooth and predictable torque transfer results.

FIG. 2 is a simplified schematic illustrating articulated deflection in one embodiment of the transmission technology described in this disclosure. FIGS. 2A and 2B are sections as shown on FIG. 2. FIG. 2 should be viewed together with FIG. 1 in order to compare the articulated deflection illustrated on FIG. 2 with the prior art LaGrange articulated deflection illustrated on FIG. 1.

Similar to FIGS. 1, 1A and 1B, FIGS. 2, 2A and 2B adopt a part number "prime" convention, where a part number without a prime notation is in the unarticulated state, and a part number with a prime notation is in the articulated state. FIG. 2 compares the relative position of ball 320 as received into Torque Transfer Element (TTE) 310 with respect to housing 205 and housing receptacle 207 in the unarticulated state (per FIG. 2A) and the articulated state (per FIG. 2B). FIG. 2 depicts ball 320 as received into TTE 310 when shaft centerline 10 is unarticulated, and ball 320' as received into TTE 310' when shaft centerline 10' is articulated.

FIG. 2A depicts ball 320 and TTE 310 retained in housing receptacle 207 between shaft wing 106 and housing 205 in the unarticulated state. By contrast, FIG. 2B depicts ball 320' and TTE 310' retained in housing receptacle 207 between shaft wing 106 and housing 205 in the articulated state. Comparison of FIGS. 2A and 2B shows that responsive to misaligned rotation of shaft centerline 10', TTE 310 floats position to TTE 310' within housing receptacle 207/207' during articulation. TTE 310's freedom to float within housing receptacle 207/207' enables substantial torque transfer contact to be maintained between all thrust surfaces (shaft wing 106, ball 320/320', TTE 310/310' and housing 205) during the misaligned rotation. In the embodiments of FIGS. 2, 2A and 2B, TTE 310/310' tends to float generally radially towards the shaft centerline 10/10' as angular deflection increases during articulated rotation, although the scope of this disclosure is not limited in this regard. Thus, responsive to articulated rotation of the shaft centerline 10/10' and regardless of amount of angular deflection during an articulated revolution of the shaft, TTE 310/310' is free to slidably displace within housing receptacle 207/207' so as to maintain substantial torque transfer contact between shaft wing 106, ball 320/320', TTE 310/310' and housing 205. Such substantial torque transfer contact reduces the potential for high stress concentrations on the thrust surfaces.

Currently preferred embodiments of ball/CV designs consistent with this disclosure thus provide a degree of encapsulation of the ball by the TTE and by the shaft wing that may vary according to the embodiment. The selected depths and locations of spherically-shaped recesses provided in the TTEs and in the shaft wings for receiving the interposed ball will determine the degree of encapsulation of the ball, and the ball's relative position on the shaft. Different embodiments may provide different degrees of encapsulation, and different ball locations on the shaft, to suit particular design applications. Various considerations will affect precise details of the design, such as, for example, (1) size of ball; (2) amount of TTE and/or shaft material desired to retain the ball in the corresponding TTE/shaft wing recesses; (3) degree of encapsulation desired; and (4) shaft radius at which to position the ball. The foregoing considerations are not exhaustive. Note that with respect to item (4), ball/CV designs consistent with this disclosure will direct torque to transfer through the ball, and so the shaft radius at which to position the ball becomes of interest.

It is therefore a technical advantage of the disclosed transmission to be capable of transferring high torque loads while discouraging wear on the interfacing components. Ball/CV designs consistent with this disclosure remain seated, engaged and in torque transfer contact through all positions of misaligned rotation in one articulated revolution.

Another technical advantage of the disclosed transmission is that the geometry allows full mechanical advantage in the torque transfer angle through the ball and TTE. As noted above, a ball is interposed between a shaft wing and the TTE. The extra degree of freedom given to TTE to rotate about the surface of the ball during articulation allows the torque vector to be transferred accurately through the interfacing components. This reduces wear and optimizes torque transfer.

In some embodiments, TTE designs consistent with this disclosure may use a larger ball. A larger ball can be advantageous to increase interface surface area to reduce contact stresses. Wear may thus be reduced in such larger ball embodiments, and particularly wear manifesting itself as cracking, galling or fretting.

According to a first aspect, therefore, this disclosure describes embodiments of a transmission, comprising: a shaft having a shaft centerline about which the shaft is disposed to rotate, the shaft providing a shaft head on one end thereof, the shaft head providing a plurality of shaft wings extending generally radially from the shaft centerline; each shaft wing providing a shaft bearing surface and a shaft backlash surface such that each shaft bearing surface opposes a shaft backlash surface on a neighboring shaft wing; a shaft recess formed in each shaft bearing surface; a generally cylindrical housing having a housing centerline about which the housing is disposed to rotate, the housing having a plurality of housing receptacles formed therein, each housing receptacle for receiving a corresponding shaft wing; a plurality of torque transfer elements (TTEs), each TTE providing a TTE recess and a TTE bearing surface; and a plurality of balls; wherein each housing receptacle provides a housing bearing surface and a housing backlash surface; wherein a shaft wing, a TTE, and a ball are received into each housing receptacle such that within each housing receptacle, the ball is received into the shaft recess and the TTE recess, the TTE bearing surface opposes the housing bearing surface, and the shaft backlash surface opposes the housing backlash surface; wherein, responsive to misaligned rotation of the shaft centerline with respect to the housing centerline, the TTEs float within their corresponding housing receptacles to maintain torque transfer contact between the shaft recess, the ball, the TTE recess, the TTE bearing surface and the housing bearing surface within each housing receptacle during said misaligned rotation.

Embodiments according to the first aspect may further provide a transmission in which at least one shaft wing further includes a shaft release channel, and in which the shaft release channel extends the shaft recess towards an outer periphery of the shaft wing such that the ball may float within the shaft release channel responsive to said misaligned rotation of the shaft centerline with respect to the housing centerline.

Embodiments according to the first aspect may further provide a transmission in which at least one TTE further includes a TTE release channel, and in which the TTE release channel extends the TTE recess towards an outer periphery of the TTE such that the ball may float within the TTE release channel responsive to said misaligned rotation of the shaft centerline with respect to the housing centerline.

According to a second aspect, this disclosure describes embodiments of a transmission, comprising: a shaft having a shaft centerline about which the shaft is disposed to rotate, the shaft providing a shaft head on one end thereof, the shaft head providing a plurality of shaft wings extending generally radially from the shaft centerline; each shaft wing providing a shaft bearing surface and a shaft backlash surface such that each shaft bearing surface opposes a shaft backlash surface on a neighboring shaft wing; a shaft recess formed in each shaft bearing surface; a generally cylindrical housing having a housing centerline about which the housing is disposed to rotate, the housing having a plurality of housing receptacles formed therein, each housing receptacle for receiving a corresponding shaft wing; a plurality of torque transfer elements (TTEs), each TTE providing a TTE recess and a TTE bearing surface; and a plurality of balls; wherein each housing receptacle provides a housing bearing surface and a housing backlash surface; wherein a shaft wing, a TTE, and a ball are received into each housing receptacle such that within each housing receptacle, the ball is received into the shaft recess and the TTE recess, the TTE bearing surface opposes the housing bearing surface, and the shaft backlash surface opposes the housing backlash surface; wherein, responsive to articulated rotation of the shaft centerline with respect to the housing centerline and regardless of angular deflection of the shaft with respect to the housing experienced by each housing receptacle during an articulated revolution of the shaft, the TTEs are free to slidably displace within their corresponding housing receptacles so as to maintain torque transfer contact between the shaft recess, the ball, the TTE recess, the TTE bearing surface and the housing bearing surface within each housing receptacle.

Embodiments according to the second aspect may further provide a transmission in which at least one shaft wing further includes a shaft release channel, and in which the shaft release channel extends the shaft recess towards an outer periphery of the shaft wing such that the ball may float within the shaft release channel responsive to said articulated rotation of the shaft centerline with respect to the housing centerline.

Embodiments according to the second aspect may further provide a transmission in which at least one TTE further includes a TTE release channel, and in which the TTE release channel extends the TTE recess towards an outer periphery of the TTE such that the ball may float within the TTE release channel responsive to said articulated rotation of the shaft centerline with respect to the housing centerline.

Embodiments according to either the first or the second aspects may further provide a transmission in which the TTEs float generally radially with respect to the shaft centerline.

Embodiments according to either the first or the second aspects may further provide a transmission in which at least one TTE is a unitary workpiece.

Embodiments according to either the first or the second aspects may further provide a transmission in which at least one TTE includes a TTE bearing cup contacting a TTE Belleville washer, such that the TTE bearing cup provides the bearing recess and the TTE Belleville washer provides the TTE bearing surface Embodiments according to either the first or the second aspects may further provide a transmission further including a backlash energizer assembly interposed between at least one opposing shaft backlash surface and housing backlash surface. In some embodiments, the backlash energizer assembly may include a puck separating a set screw and a backlash energizer Belleville washer, such that the backlash energizer Belleville washer is disposed to contact the shaft backlash surface. In other embodiments, the backlash energizer assembly may include a backlash energizer plate separating a set screw and a backlash energizer ball, such that the backlash energizer ball is disposed to contact the shaft backlash surface. In other embodiments, the backlash energizer may include a puck, wherein the puck is disposed to contact the shaft backlash surface. In other embodiments, the puck may include a laminate of metal and elastomer layers.

The foregoing has rather broadly outlined some features and technical advantages of the disclosed transmission designs, in order that the following detailed description may be better understood. Additional features and advantages of the disclosed technology may be described further below. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described.

BRIEF DESCRIPTION OF THE DRAWINGS

For a more complete understanding of the embodiments described in this disclosure, and their advantages, reference is made to the following detailed description taken in conjunction with the accompanying drawings, in which:

FIG. 3B is a perspective view of lower housing 205L on FIG. 3A in isolation;

FIG. 3C is a section as shown on FIG. 3B;

FIGS. 7A and 7B are "faux section" views of shaft assembly 100 substantially assembled at lower housing assembly 200L per FIGS. 3A, 4A and 4B, in which FIGS. 7A and 7B combine to schematically depict articulation during misaligned rotation;

FIG. 8A is a section similar to FIG. 4A, except depicting Bellville TTE assembly 330 as a further alternative embodiment to TTE assembly 300 as shown on FIGS. 3A and 6, for example;

FIG. 8B is an exploded view of Belleville TTE assembly 330 from FIG. 8A in isolation;

FIG. 9A is a section similar to FIG. 4A, except depicting an alternative embodiment including backlash energizer assembly 400;

FIG. 9B is an exploded view of backlash energizer assembly 400 from FIG. 9A in isolation;

DETAILED DESCRIPTION

The following description of embodiments provides non-limiting representative examples using Figures, diagrams, schematics, flow charts, etc. with part numbers and other notation to describe features and teachings of different aspects of the disclosed technology in more detail. The embodiments described should be recognized as capable of implementation separately, or in combination, with other embodiments from the description of the embodiments. A person of ordinary skill in the art reviewing the description of embodiments will be capable of learning and understanding the different described aspects of the technology. The description of embodiments should facilitate understanding of the technology to such an extent that other implementations and embodiments, although not specifically covered but within the understanding of a person of skill in the art having read the description of embodiments, would be understood to be consistent with an application of the disclosed technology.

Reference is now made to FIGS. 3A through 11 in describing the currently preferred embodiments of the disclosed transmission. For the purposes of the following disclosure, FIGS. 3A through 11 should be viewed together. Any part, item, or feature that is identified by part number on one of FIGS. 3A through 11 will have the same part number when illustrated on another of FIGS. 3A through 11. It will be understood that the embodiments as illustrated and described with respect to FIGS. 3A through 11 are exemplary, and the scope of the inventive material set forth in this disclosure is not limited to such illustrated and described embodiments.

Figure 1A:
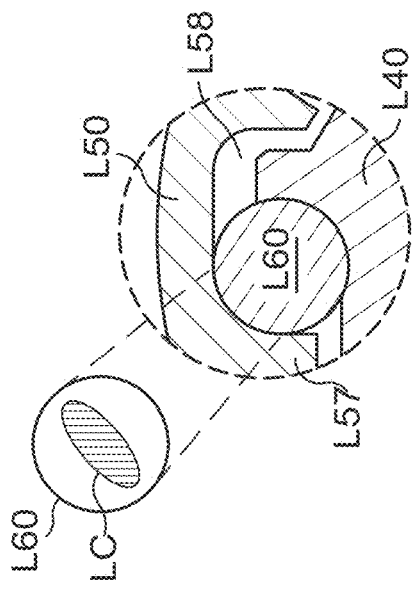
FIG. 1A is a section as shown on FIG. 1.
Figure 1B:
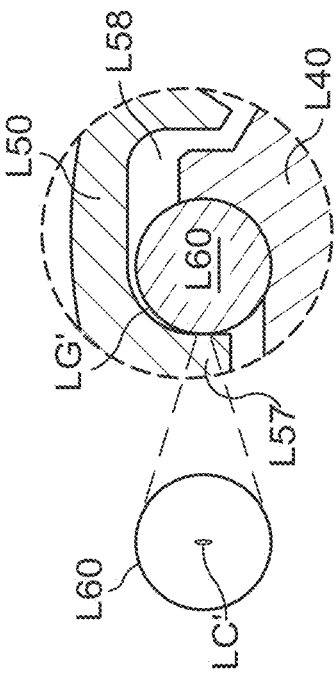
FIG. 1B is a section as also shown on FIG. 1.
Figure 1:
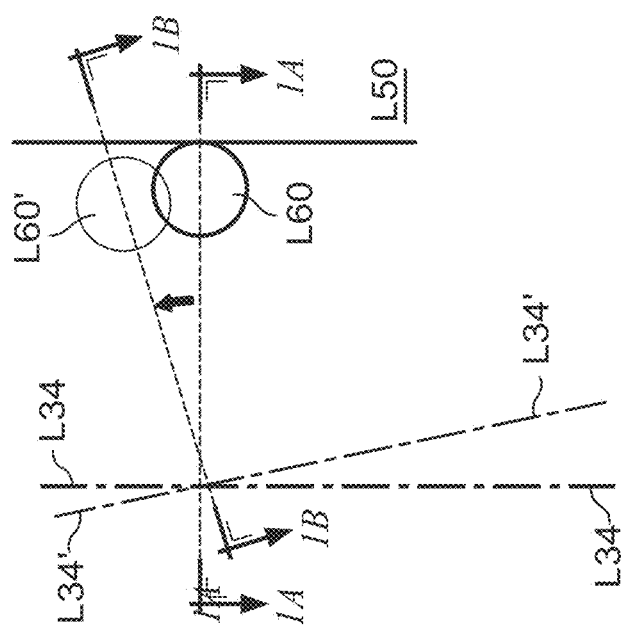
FIG. 1 is a simplified schematic illustrating articulated deflection in a prior art transmission.
Figure 2A:
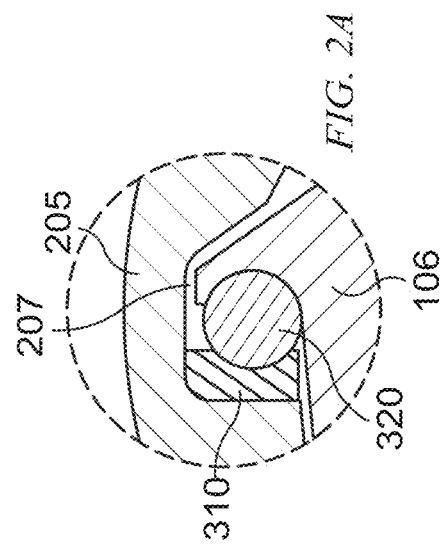
FIG. 2A is a section as shown on FIG. 2.
Figure 2B:
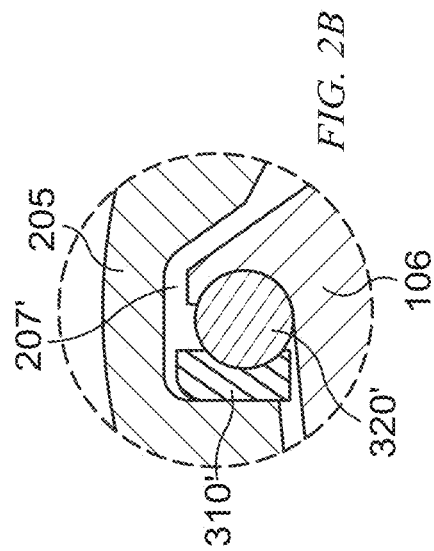
FIG. 2B is a section as also shown on FIG. 2.
Figure 2:
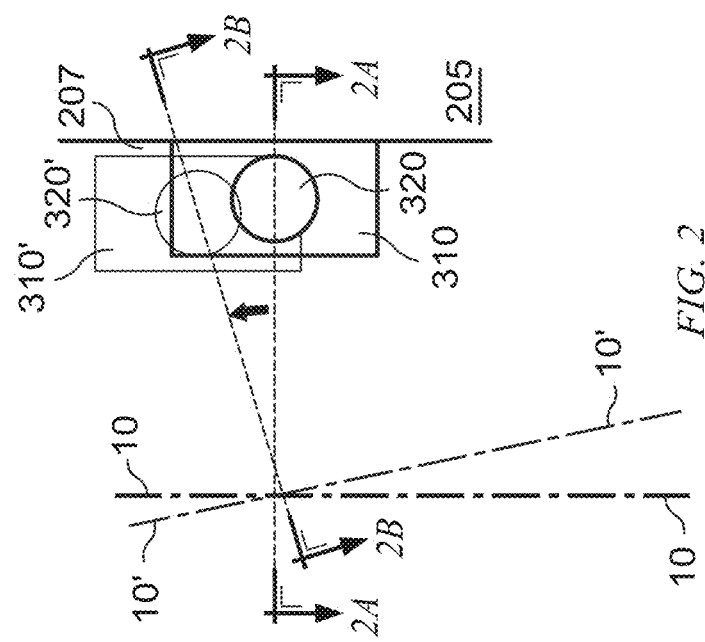
FIG. 2 is a simplified schematic illustrating articulated deflection in one embodiment of the transmission technology described in this disclosure.
Figure 3A:
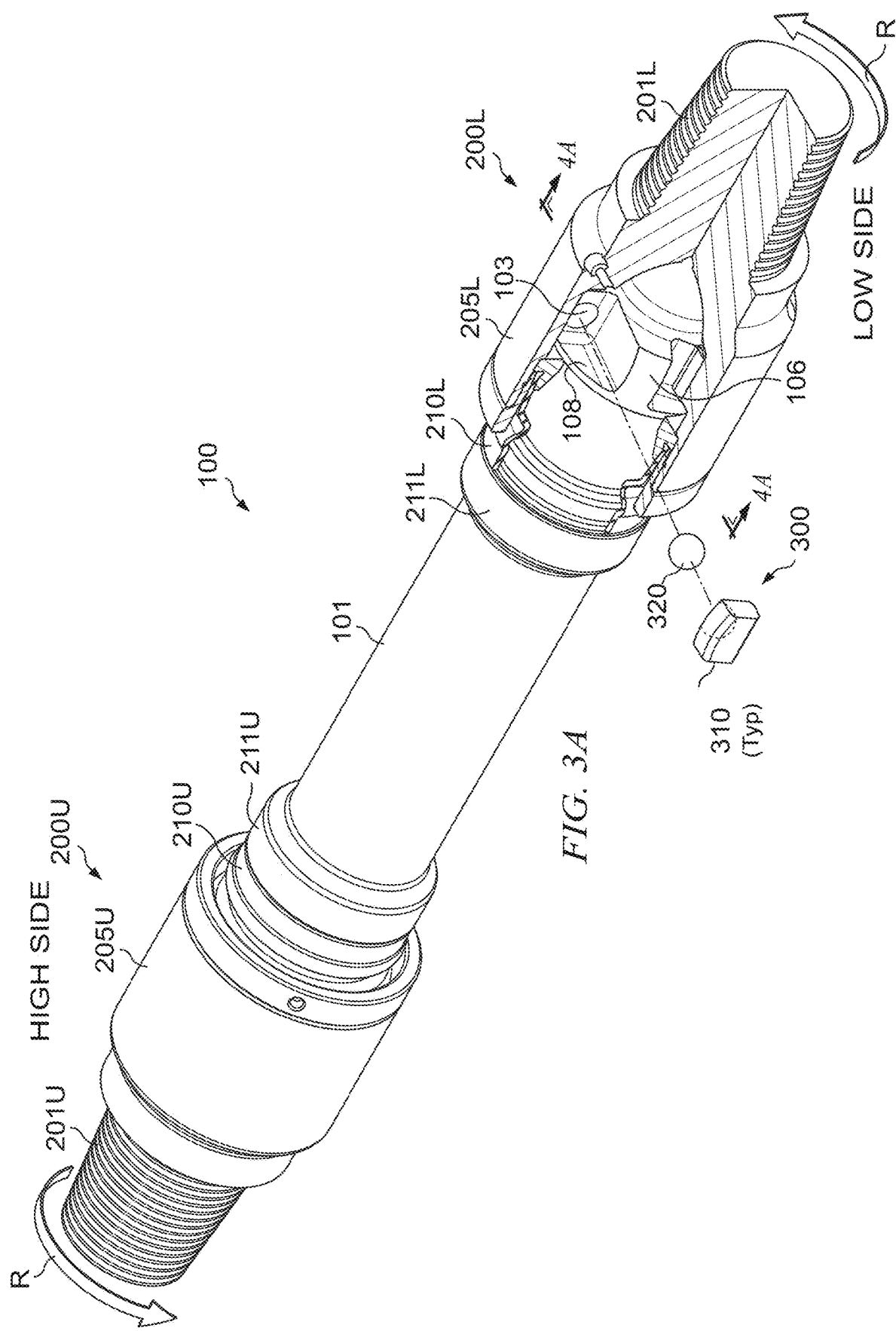
FIG. 3A is partial cutaway and exploded view of a first transmission embodiment according to this disclosure.

FIG. 3A is partial cutaway and exploded view of a first transmission embodiment according to this disclosure. FIG. 6 is a fully exploded view of the transmission embodiment shown on FIG. 3A. Generally on FIGS. 3A and 6, torque is shown transmitted from upper housing assembly 200U into shaft assembly 100, and then into lower housing assembly 200L. A general convention is followed throughout the embodiments illustrated on FIGS. 3A through 11, in which clockwise torque is transmitted from an illustrated "high side" (see notation near upper housing assembly 200U on FIGS. 3A and 6) to an illustrated "low side" (see notation near lower housing assembly 200L). This convention follows the generally accepted subterranean drilling convention of "clockwise rotation looking downhole". In particular, this convention follows the general convention of configuring the rotor of a positive displacement motor ("PDM" or "mud motor") to rotate in a clockwise direction looking downhole.

It will be understood, however, that the scope of this disclosure is not limited to embodiments following the "clockwise looking downhole" convention for rotation and torque. Alternative embodiments, not illustrated, configured to transmit counterclockwise torque looking downhole are within the scope of this disclosure. Persons of ordinary skill in this art will require very little experimentation to adapt the embodiments illustrated on FIGS. 3A through 11 of this disclosure to transfer torque in the opposite direction from the direction illustrated. In many cases, it will require no more than reversing orientations of illustrated components or creating "mirror images" of illustrated assemblies.

Torque Transfer

FIGS. 3A and 6 should be viewed together for a more detailed understanding of torque transmission from upper housing assembly 200U into shaft assembly 100, and then into lower housing assembly 200L, all according to a first illustrated transmission embodiment. Upper housing assembly 200U includes upper housing 205U, which in turn includes upper pin threads 201U provided on one end thereof. Upper threads 201U are preferably configured to mate with an adapter ultimately connected rotatably to a PDM rotor, although the scope of this disclosure is not limited any particular component with which upper threads 201U may be configured to mate. Torque rotation direction R on FIGS. 3A and 6 illustrates clockwise rotation of upper housing assembly 200U looking downhole, consistent with the corresponding general convention of configuring a PDM rotor to rotate clockwise looking downhole, as described above.

Lower housing assembly 200L includes lower housing 205L, which in turn includes lower pin threads 201L provided on one end thereof. Lower threads 201L are preferably configured to mate with a motor bearing mandrel or drive shaft ultimately connected to a rotary bit, although the scope of this disclosure is not limited any particular component with which lower threads 201L may be configured to mate. Torque rotation direction R on FIGS. 3A and 6 further illustrates clockwise rotation of lower housing assembly 200L looking downhole, consistent with the corresponding general convention of configuring a PDM rotor to rotate clockwise looking downhole, as described above.

FIGS. 3A and 6 show upper and lower housings 205U, 205L as hollow, with internal receptacles and surfaces formed therein according to Figures and detailed description set forth below. FIGS. 3A and 6 further show that shaft assembly 100 provides a shaft head 102 at each end of shaft 101. As will be described in more detail further below, each shaft head 102 is configured to be received into a corresponding one of upper and lower housings 205U, 205L and, when received therein, to interface with receptacles and surfaces formed internally on upper and lower housings 205U, 205L. As seen on FIGS. 3A and 6, each shaft head 102 provides a preselected number of shaft wings 106. Shaft wings 106 are preferably spaced equally in radial disposition around shaft head 102, although the scope of this disclosure is not limited to equi-spaced radial disposition. Five (5) shaft wings 106 are provided on each shaft head 102 in the embodiments illustrated on FIGS. 3A through 11, although again the scope of this disclosure is not limited to any particular number of shaft wings 106 per shaft head 102. Other embodiments (not illustrated) may provide shaft heads with other numbers of shaft wings, and/or with other than equi-spaced radial disposition. Other embodiments (not illustrated) may also provide a number and spacing configuration of shaft wings on a shaft head at one end of a shaft that differs from the number and spacing configuration of shaft wings at the other end of the shaft.

FIG. 6 illustrates each shaft wing 106 providing a shaft bearing surface 104 and a shaft backlash surface 105. The shaft bearing surface 104 on one shaft wing 106 generally faces the shaft backlash surface 105 of a neighboring shaft wing 106. FIGS. 3A and 6 further depict each shaft bearing surface 104 providing a shaft recess 103 formed therein.

FIGS. 3A and 6 further illustrate Torque Transfer Element ("TTE") assemblies 300 interposed between shaft wings 106 and upper and lower housings 205U, 205L when shaft heads 102 are received into upper and lower housings 205U, 205L. TTE assemblies 300 each include TTE 310 and ball 320 in the embodiments illustrated on FIGS. 3A and 6. As shown on FIG. 3A, balls 320 are received into shaft recesses 103 in shaft wings 106. Preferably, one (1) TTE assembly 300 is provided for each shaft wing 106, as depicted in the embodiments illustrated throughout FIGS. 3A through 11 in this disclosure. It will nonetheless be appreciated that the scope of this disclosure is not limited in this regard, and other embodiments may provide some shaft wings without TTE assemblies.

Currently preferred embodiments further provide shaft webs 108, as illustrated on FIGS. 3A and 6. In such currently preferred embodiments, shaft webs 108 connect shaft bearing surfaces 104 (on shaft wings 106) and shaft backlash surfaces 105. In such embodiments, shaft webs 108 thus combine to provide a circumferential "flange" connecting shaft wings 106. This additional "flange" material strengthens shaft head 102 during torque transfer (and especially during articulation), and further provides a "pocket" for each TTE assembly 300 to assist with keeping TTE assemblies 300 from becoming contact-disengaged during articulation.

It will be nonetheless appreciated that the scope of this disclosure is not limited to embodiments providing shaft webs 108. Referring momentarily to FIGS. 7A and 7B and imagining such views without shaft webs 108, other embodiments (not illustrated herein) may provide near shaft distance Δ1 still greater than far shaft diameter Δ2 without the circumferential "flange" material described in the preceding paragraph. In yet further embodiments, again not illustrated herein, near shaft diameter Δ1 and far shaft diameter Δ2 as designated on FIGS. 7A and 7B may be substantially the same, with slots provided to retain torque-transferring balls (such as seen in some conventional designs).

FIGS. 3A and 6 further illustrate boots 210U/L, boot retaining rings 211U/L and split rings 212U/L to seal the connection between shaft 101 and upper and lower housings 205U, 205L at either end of shaft 101. Boots 210U/L are preferably made of a rubber or elastomer material in order to provide seals while at the same time permitting independent articulation between shaft 101 and upper housing 205U at one end of shaft 101, and between shaft 101 and lower housing 205L at the other end of shaft 101.

From this point forward in this "Detailed Description" section, the Figures and associated disclosure will describe features, aspects and alternative embodiments with reference to assemblies at the "low side" as drawn on FIGS. 3A and 6. That is, the Figures and associated disclosure will describe features, aspects and alternative embodiments in and around and associated with lower housing assembly 200L as depicted on FIGS. 3A and 6. Persons of ordinary skill in this art will require very little experimentation to reverse the orientation of embodiments illustrated with reference to the "low side" on FIGS. 3A and 6 in order to understand corresponding assemblies and features on the "high side".

FIG. 3B is a perspective view of lower housing 205L on FIG. 3A in isolation. FIG. 3C is a section as shown on FIG. 3B. FIG. 3C shows housing receptacles 207 provided in lower housing 205L. With momentary reference to FIGS. 3A and 6, it will be appreciated that lower housing 205L provides one (1) housing receptacle 207 each for receiving a corresponding shaft wing 106 on shaft head 102. Thus, five (5) housing receptacles 207 are illustrated on FIG. 3C, one each for receiving a corresponding one of the five (5) shaft wings 106 shown on FIG. 6.

FIG. 3C further illustrates that each housing receptacle 207 provides a housing bearing surface 203 and a housing backlash surface 202. FIG. 3B illustrates housing bearing surfaces 203 and housing backlash surfaces 202 in perspective view.

FIGS. 3B and 3C further illustrate optional hard facing 209 inside lower housing 205L. In embodiments where provided, hard facing 209 assists reducing wear thrust wear between shaft head 102 and lower housing 205L during articulated/misaligned rotation of shaft head 102 as connected to lower housing 205L. It will be understood that hard facing 209 may optionally also be provided in upper housing 205U. In other non-illustrated embodiments, a thrust bearing may be provided instead of hard facing 209.

Figure 4A:
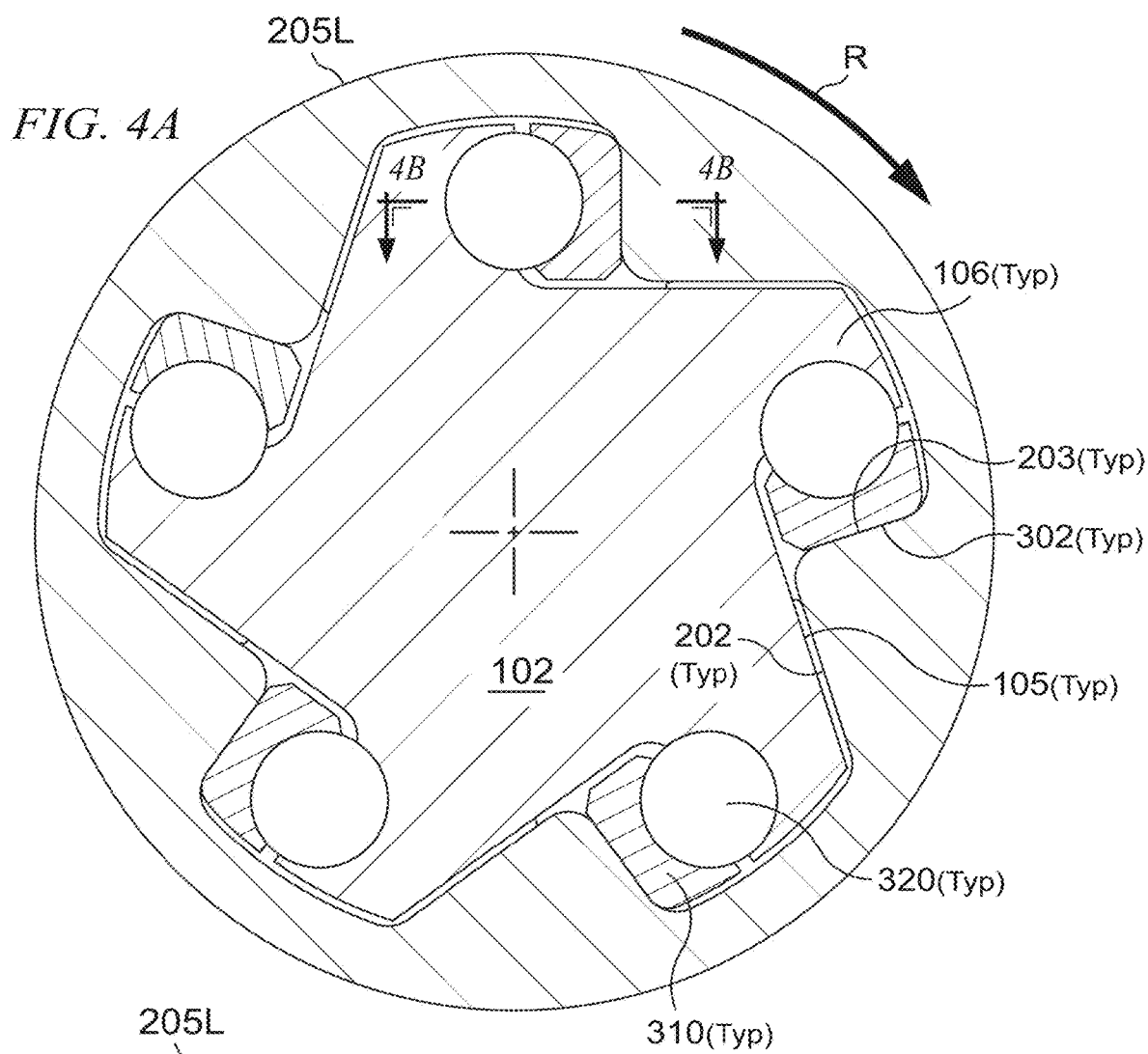
FIG. 4A is a section as shown on FIG. 3A.
Figure 4B:
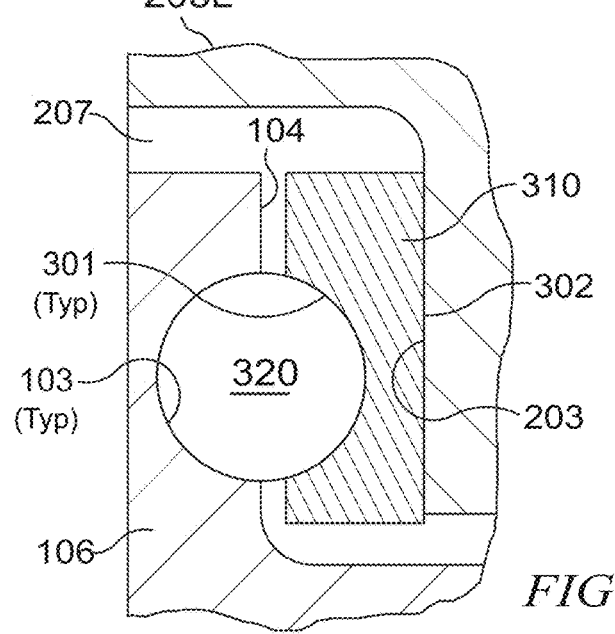
FIG. 4B is a section as shown on 4A.

FIG. 4A is a section as shown on FIG. 3A. FIG. 4B is a section as shown on FIG. 4A. FIGS. 4A and 4B show shaft wings 106 engaged with balls 320 and TTEs 310 in housing receptacles 207. FIG. 4B shows TTE recesses 301 formed in TTEs 310 for receiving balls 320. FIG. 4A illustrates torque transfer in a clockwise direction in the following sequence (A) through (C): (A) from shaft wings 106 on shaft head 102 into balls 320; (B) through balls 320 and into TTEs 310; and then (C) through TTEs 310 and into lower housing 205L via housing bearing surfaces 203. Such clockwise torque transfer on FIG. 4A is consistent with clockwise rotation direction R as shown on FIG. 4A. FIGS. 4A and 4B further illustrate that during such clockwise torque transfer, TTE bearing surface 302 bears upon housing bearing surface 203. FIG. 4B also shows that during such clockwise torque transfer, shaft recesses 103 formed in shaft bearing surfaces 104 bear upon balls 320, and balls 320 bear upon TTE recesses 301.

With reference now to FIG. 6, it will be understood that a reverse transfer sequence enables clockwise torque transfer at upper housing assembly 200U, in which torque is transferred in the following sequence (A) to (C): (A) from upper housing 205U into TTEs 310; (B) through TTEs 310 and into balls 320; and then (C) through balls 320 and into shaft wings 106 on shaft head 102. This reverse sequence is like imagining torque transfer on FIG. 4A in the opposite direction (counterclockwise) to rotation direction R as illustrated on FIG. 4A.

FIGS. 7A and 7B are "faux section" views of shaft assembly 100 substantially assembled at lower housing assembly 200L per FIGS. 3A, 4A and 4B, in which FIGS. 7A and 7B combine to schematically depict articulation during misaligned rotation. By "faux section" views, it will be understood from FIGS. 4A and 6 that since the illustrated embodiments depict five (5) shaft wings 106 and associated TTE balls 320 distributed evenly around the periphery of shaft head 102, a true straight line section through the assembly of shaft assembly 100 at lower housing assembly 200L does not allow opposing shaft wings 106 to be seen on one view. Thus, FIGS. 7A and 7B depict more of a "pie-shaped" or "offset" section through the assembly of shaft assembly 100 at lower housing assembly 200L, so that opposing shaft wings 106 can be seen on each of FIGS. 7A and 7B.

FIG. 7A illustrates shaft assembly 100 substantially assembled at lower housing assembly 200L without shaft misalignment. FIG. 7B illustrates shaft assembly 100 substantially assembled at lower housing assembly 200L with shaft misalignment as seen during articulation. Referring now to FIG. 3A, TTE balls 320 are retained in shaft recesses 103 in shaft wings 106. Thus, comparing FIG. 7A to FIG. 7B, it will be seen that TTE balls 320 retain their relative position with respect to shaft wings 106 during articulation, even as shaft wings 106 displace with respect to lower housing 205L.

Now referring to FIGS. 4A and 4B, it will be further seen that TTEs 310 are given space within housing receptacles 207 to permit sliding displacement of TTEs during articulation. (Refer to FIGS. 3B and 3C for additional detail on housing receptacles 207). Responsive to rotation and tilt of TTEs 310 around balls 320, such sliding displacement of TTEs 310 further enables bearing surfaces 302 and housing bearing surfaces 203 to remain in contact throughout articulation.

As a result, torque transfer occurs through all shaft wings 106 and corresponding TTE assemblies 300 around the periphery of shaft head 102 during articulation, regardless of the change of angular deflection experienced by a particular shaft wing/TTE assembly during one articulated revolution. This arrangement in turn enables smooth torque transfer, keeping torque transfer force directions normal to the direction of rotation and keeping TTE assemblies 300 stable and contact-engaged against shaft wings 106 within housing receptacles 207 throughout a complete articulated revolution. Point loads are avoided. This arrangement further limits stress and wear on the shaft wing/TTE assembly units by ensuring that all units remain contact-engaged and participate in torque transfer throughout a complete articulated revolution. Situations are avoided in which torque might be transferred through perhaps only one or two shaft wing/TTE assembly units at any moment in time because articulation has caused the other units to become contact-disengaged.

Although the foregoing torque transfer description has been made with reference to lower housing 205L on FIGS. 3A, 4A, 4B, 6, 7A and 7B, it will be understood that such description applies equally at upper housing 205U shown on FIGS. 3A and 6.

Figure 12A:
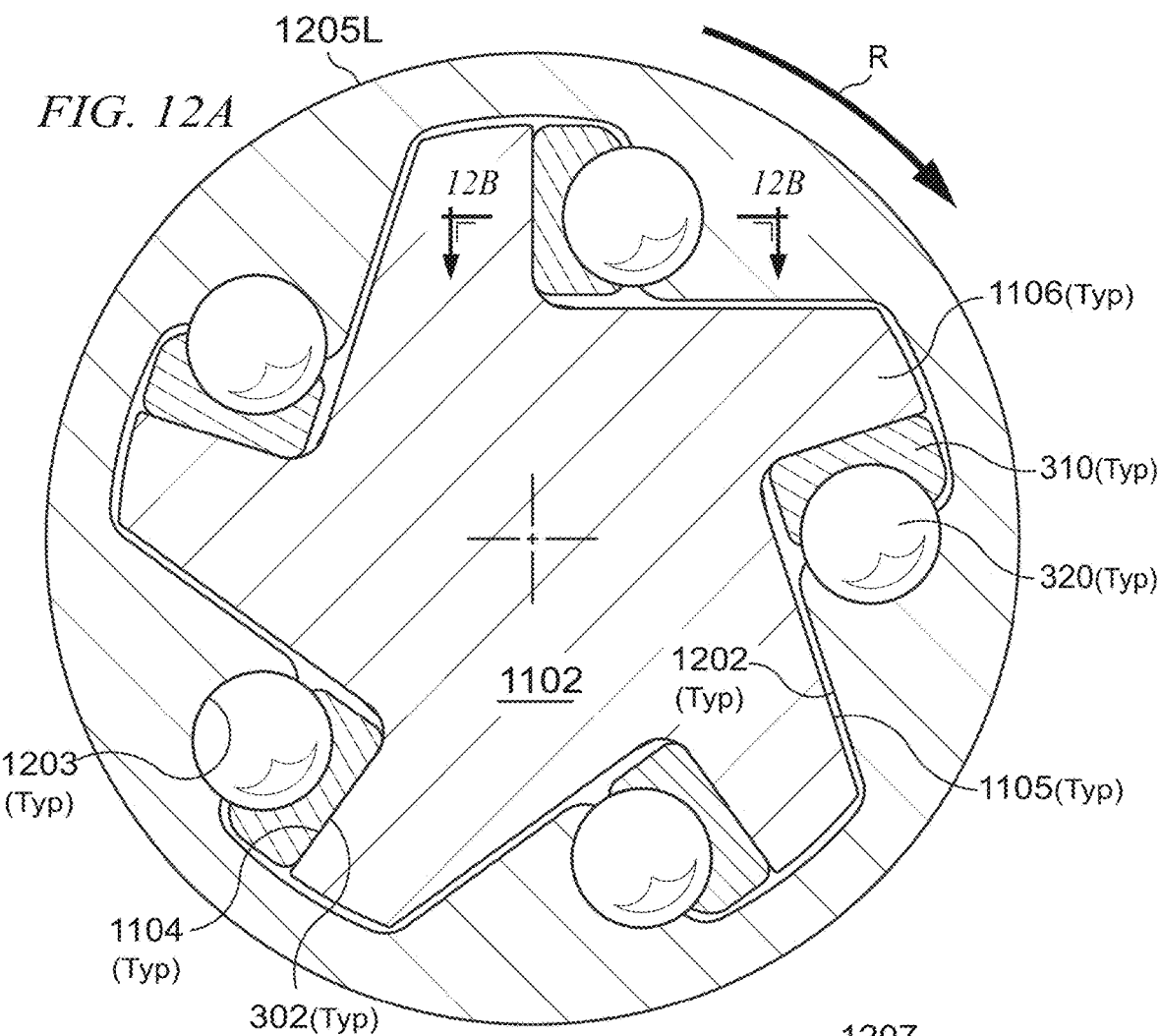
FIG. 12A depicts an alternative transmission embodiment "reversed" from the embodiment shown on FIG. 4A.
Figure 12B:
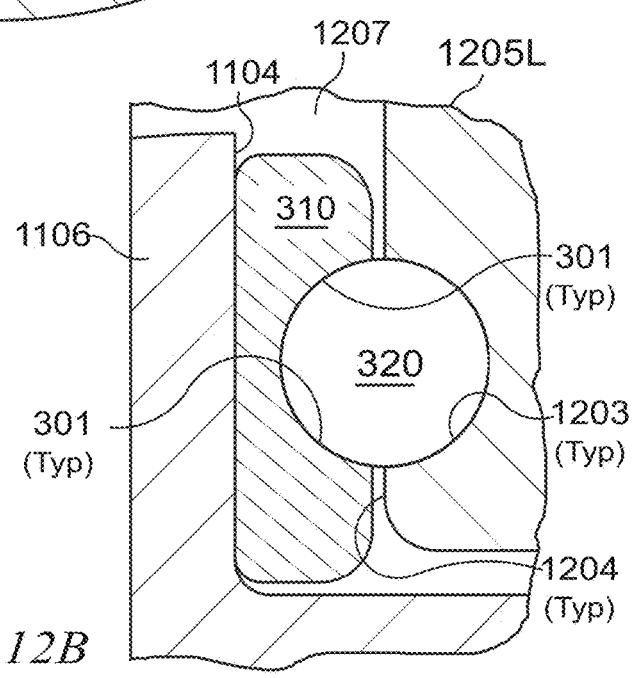
FIG. 12B is a section as shown on FIG. 12A.
Figure 12C:
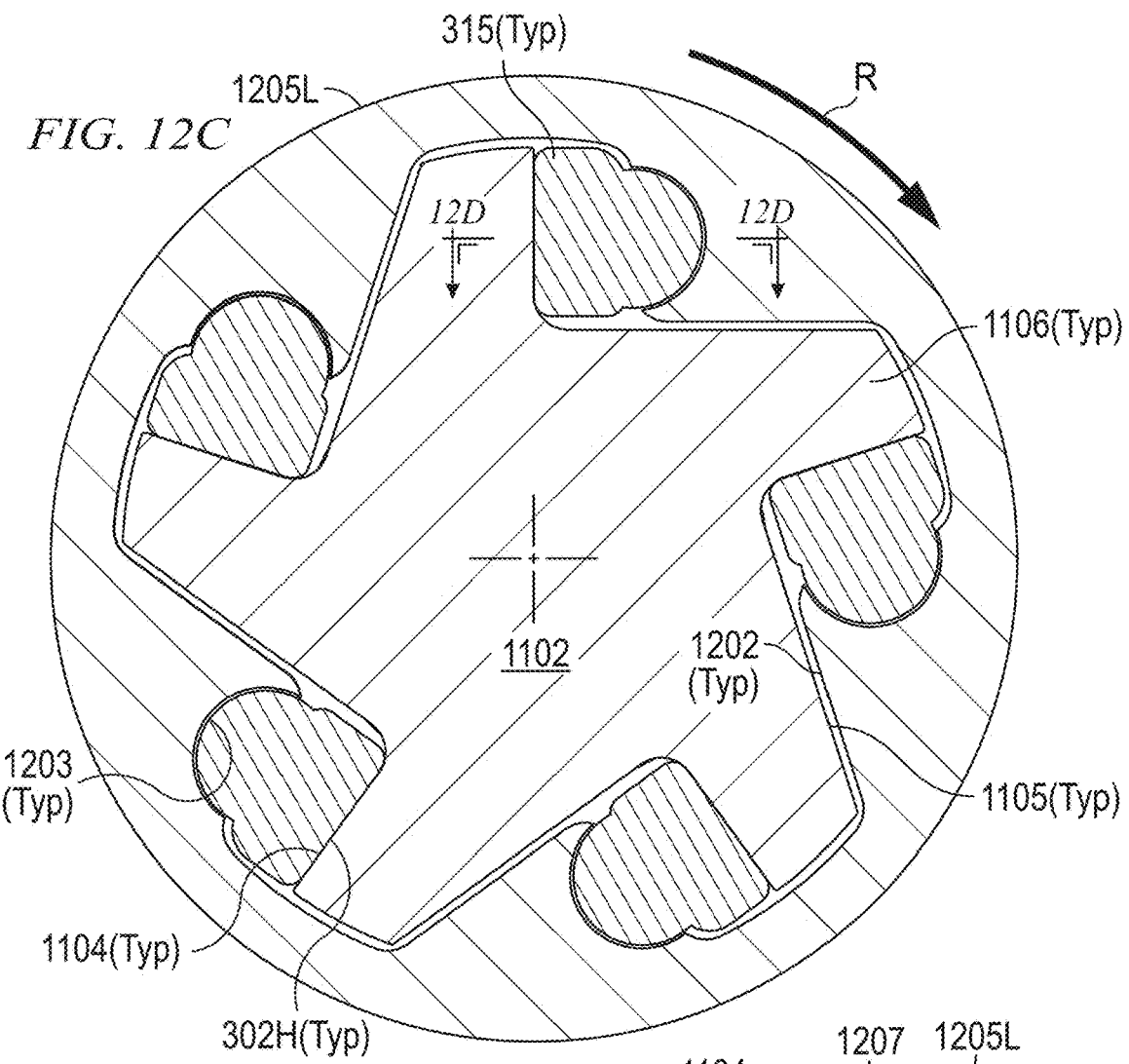
FIG. 12C depicts an alternative transmission embodiment "reversed" from the embodiment shown on FIG. 4C.
Figure 12D:
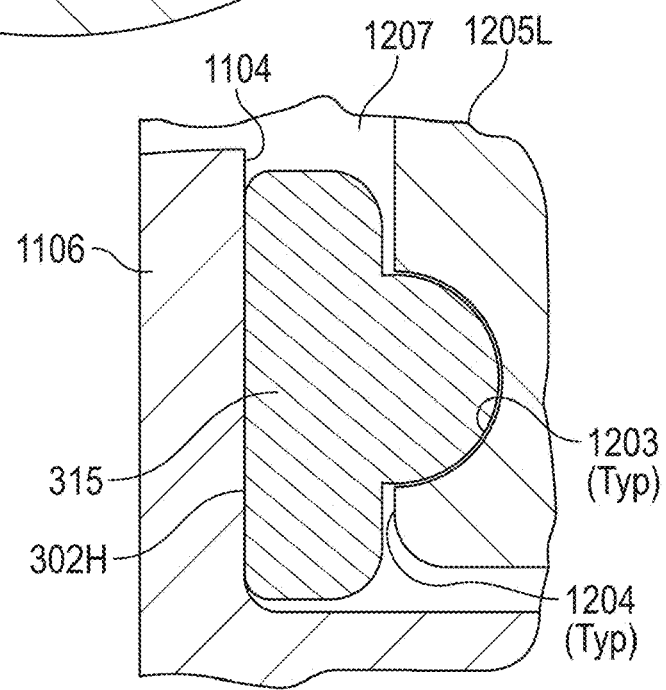
FIG. 12D is a section as shown on FIG. 12C.

The foregoing description of torque transfer has been made with reference to embodiments in which ball 320 is interposed between and received in TTE recess 301 and shaft recess 103. It will be nonetheless appreciated that, consistent with the broader scope of this disclosure, alternative embodiments may provide TTE 310 reversed within housing receptacle 207, such that ball 320 is interposed between and received in TTE recess 301 and a new recess provided in housing bearing surface 203. In such "reverse" embodiments, shaft bearing surface 104 may be plain (without shaft recess 103 formed therein) and disposed to contact TTE bearing surface 302 during torque transfer. FIGS. 12A and 12B illustrate an example of such a "reverse" embodiment. FIG. 12A depicts an alternative transmission embodiment "reversed" from the embodiment shown on FIG. 4A. FIG. 12B is a section as shown on FIG. 12A. FIGS. 12A and 12B show modified shaft wings 1106 engaged with TTEs 310 and balls 320 in modified housing receptacles 1207. FIG. 12B shows TTE recesses 301 formed in TTEs 310 for receiving balls 320. FIG. 12A illustrates torque transfer in a clockwise direction in the following sequence (A) through (C): (A) from modified shaft wings 1106 on modified shaft head 1102 into TTEs 310 via shaft bearing surfaces 1104; (B) through TTEs 310 and into balls 320; and then (C) through balls 320 and into modified lower housing 1205L via housing recesses 1203 in modified lower housing 1205L. Such clockwise torque transfer on FIG. 12A is consistent with clockwise rotation direction R as shown on FIG. 12A. FIGS. 12A and 12B further illustrate that during such clockwise torque transfer, shaft bearing surfaces 1104 bear upon TTE bearing surfaces 302. FIG. 12B also shows that during such clockwise torque transfer, TTE recesses 301 bear upon balls 320, and balls 320 bear upon housing recesses 1203 formed in modified lower housings. Such "reverse" embodiments may provide a trade-off for advantages and disadvantages and may be suitable in appropriate deployments. As a potential advantage, shaft recess 103 shown on FIGS. 4A and 4B is obviated on modified shaft wing 1106 shown on FIGS. 12A and 12B, allowing modified shaft wing 1106 to be made thicker and thus stronger. Conversely, however, depending on geometry of a particular design, TTE 310 may have less freedom to float within modified housing receptacle 1207 in the "reverse" design of FIGS. 12A and 12B. FIGS. 12C and 12D illustrate a further example of "reversed" embodiments. FIG. 12C depicts an alternative transmission embodiment "reversed" from the embodiment shown on FIG. 4C. FIG. 12D is a section as shown on FIG. 12C. FIGS. 12C and 12D are discussed in more detail further below under "Alternative TTE embodiments". The embodiments illustrated on FIGS. 12C and 12D are related to FIGS. 12A and 12B, however, in that UTTEs 315 on FIGS. 12C and 12D substitute for balls 320 and TTEs 310 on FIGS. 12A and 12B. UTTEs 315 are described in more detail below with reference to FIGS. 5H and 5I.

The foregoing description of torque transfer has been made with reference to illustrated embodiments in which two housing assemblies 200U and 200L are provided, one at each end of shaft 101. The scope of this disclosure is not limited, however, to two housing assemblies on shaft 101. Other embodiments (not illustrated) may provide only one housing assembly on shaft 101, on a selected end thereof, with the other end of shaft 101 not articulating. In such other embodiments, the scope of this disclosure is further not limited as to the selected end of shaft 101 (upper or lower) on which the single housing assembly is to be provided.

Torque Backlash

Referring now to FIGS. 3A and 6, it will be understood that counterclockwise torque backlash will be created in upper and lower housing assemblies 200U, 200L whenever clockwise torque through shaft 101 is reduced, stopped or even reversed. Torque backlash may be momentary or sustained, responsive to corresponding changes in transmitted torque over time through shaft 101.

FIG. 4A illustrates that during torque backlash in lower housing assembly 200L, clockwise torque is no longer transferred through balls 320 and TTEs 310. Instead, counterclockwise torque backlash causes shaft backlash surface 105 to bear upon housing backlash surface 202. Although not specifically illustrated, it will be understood that the corresponding effect occurs in upper housing assembly 200U.

Figure 9C:
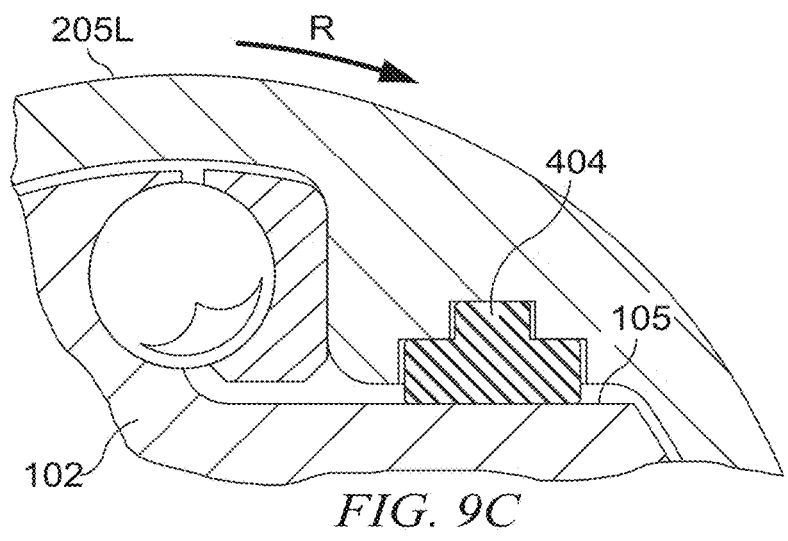
FIGS. 9C and 9D, FIGS. 9E and 9F, and FIGS. 9G and 9H are matched pairs of cutaway section views and corresponding exploded isolation views of alternative backlash energizer embodiments.

FIGS. 9A through 9F illustrate currently preferred embodiments of alternative backlash energizer assemblies, which, when provided, seek to remediate negative effects of torque backlash. FIG. 9A is a section similar to FIG. 4A, except depicting an alternative embodiment including backlash energizer assembly 400. FIG. 9B is an exploded view of backlash energizer assembly 400 from FIG. 9A in isolation. FIGS. 9C and 9D, FIGS. 9E and 9F, and FIGS. 9G and 9H are each matched pairs of cutaway section views and corresponding exploded isolation views of alternative backlash energizer embodiments 404, 404A and 420.

Referring first to FIGS. 9A and 9B, backlash energizer assemblies 400 each include set screw 101, puck 402, and Belleville washer 403. Pucks 402 are preferably of unitary hard material construction, such as metal or ceramic. Referring now to FIGS. 4A and 9A together, each backlash energizer assembly 400 is shown on FIG. 9A interposed between a shaft backlash surface 105 and a corresponding housing backlash surface 202 per FIG. 4A. Each Belleville washer 403 is configured to contact and provide compression bias against shaft backlash surface 105 such that torque backlash will act against Belleville washer 403's bias during backlash events. Each Belleville washer 403 is further positioned to react against puck 402 as received into a corresponding recess in housing backlash surface 202. Set screws 401 may be inserted from the outside of lower housing 205L through openings 208 provided for such purpose. Set screws 401 engage threads provided in openings 208 to set a user-desired compression bias for Belleville washers 403 against shaft backlash surfaces 105.

It will thus be appreciated from FIGS. 9A and 9B that backlash energizer assemblies 400 dampen and absorb torque backlash during backlash events. Belleville washers 403 (and their associated compression bias) receive torque backlash, and may further temporarily store some of the torque backlash energy during backlash events. Several technical advantages are thus provided. Wear between shaft backlash surface 105 and housing backlash surface 202 is reduced, Concussive energy loss between shaft backlash surface 105 and housing backlash surface 202 is also reduced by removal of a gap between the two. Further, torque energy during backlash events is not completely lost. Referring to FIG. 9A, any torque backlash energy stored in Belleville washers 403 during a backlash event will be released when clockwise torque is reestablished (per rotation direction R). Further, compression bias of Belleville washers 403 tends to keep shaft wings 106, balls 320, TTEs 310 and housing bearing surfaces 203 fully engaged by continuous contact during both normal torque transfer periods and torque backlash events. This in turn: (1) reduces wear on contact surfaces on shaft wings 106, balls 320, TTEs 310 and housing bearing surfaces 203; (2) reduces concussive energy loss during a transition back to normal torque after a torque backlash event; and (3) reduces the chance of TTE assemblies 300 becoming dislocated between shaft wings 106 and housing bearing surfaces 203 during torque backlash events.

Figure 9D:
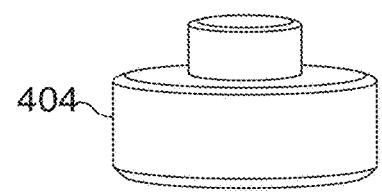

FIGS. 9C and 9D illustrate an alternative embodiment to the backlash energizer assembly 400 of FIGS. 9A and 9B. On FIGS. 9C and 9D, torque backlash remediation is provided by a single puck 404. Similar to puck 402 in backlash energizer assembly 400, puck 404 is preferably of unitary hard material construction, such as metal or ceramic. Puck 404 on FIGS. 9C and 9D provides advantages of simplicity of construction and assembly over backlash energizer 400 on FIGS. 9A and 9B, at the expense of advantages that may be provided by the compression bias of Belleville washer 403 in backlash energizer 400, described above.

Figure 9E:
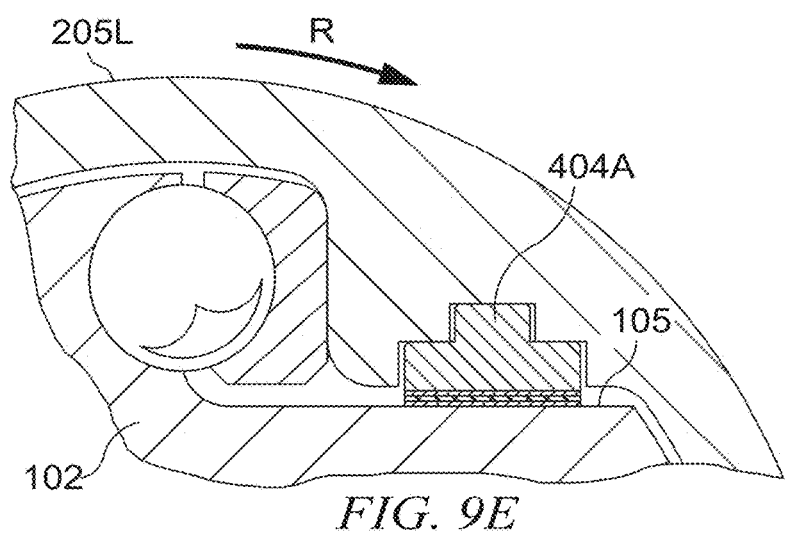
Figure 9F:
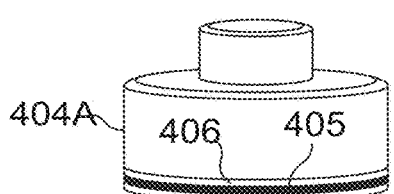

FIGS. 9E and 9F illustrate an alternative embodiment to the backlash energizer embodiment illustrated on FIGS. 9C and 9D. On FIGS. 9E and 9F, a laminated puck 404A substituted for the plain single puck 404 of FIGS. 9C and 9D. Laminated puck 404A provides a resilient laminate construct for opposing contact with shaft backlash surface 105, in which the laminate preferably includes alternating elastomer layers 405 and metal layers 406. The laminate, however, may be of any suitable materials. The scope of this disclosure is not limited in this regard. The scope of this disclosure is further not limited to the design of laminate, including as to number of layers and their thicknesses. Puck 404A on FIGS. 9E and 9F provides similar advantages of simplicity of construction and assembly as puck 404 on FIGS. 9C and 9D, and the laminar construction of puck 404A may also provide some (or all) of the advantages that may be provided by the compression bias of Belleville washer 403 in backlash energizer 400, described above.

Figure 9G:
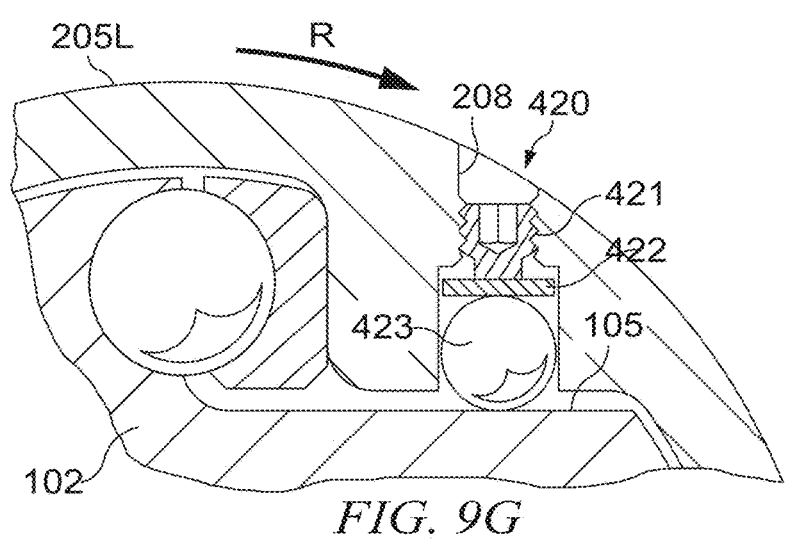
Figure 9H:
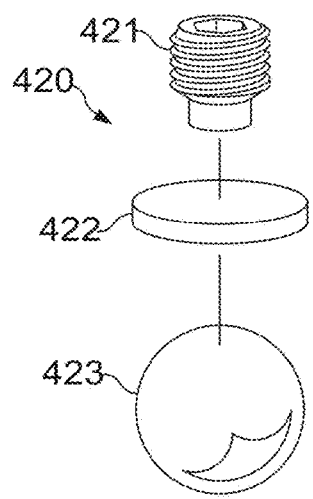

FIGS. 9G and 9H illustrate backlash energizer assembly 420 as a yet further alternative embodiment to backlash energizers previously described with reference to FIGS. 9A and 9B, 9C and 9D, and 9E and 9F. Backlash energizer assembly 420 includes set screw 421, plate 422 and ball 423. Backlash energizer assembly 420 on FIGS. 9G and 9H is similar in overall design to backlash energizer assembly 400 on FIGS. 9A and 9B, except that plate 422 in assembly 420 substitutes for puck 402 in assembly 400, and ball 423 in assembly 420 substitutes for Belleville washer 423 in assembly 400. Also, comparing FIGS. 9G and 9A, the recess provided in lower housing 205L for plate 422 and ball 423 on FIG. 9G may have to be adapted dimensionally to suit plate 422 and ball 423 as compared to the corresponding recess for puck 402 and Belleville washer 403 on FIG. 9A. Preferably the recess provided on FIG. 9G leaves sufficient clearance from ball 423 to allow ball 423 to rotate within such recess. Backlash energizer assembly 420 on FIGS. 9G and 9H thus further facilitates keeping shaft wings 106, balls 320, TTEs 310 and housing bearing surfaces 203 fully contact-engaged during both normal torque periods and torque backlash events even when (especially when) there is relative articulating movement between shaft backlash surface 105 and housing backlash surface 202. It will be appreciated that in previously described embodiments (FIGS. 9A and 9B, 9D and 9E, and 9F and 9G), keeping shaft wings 106, balls 320, TTEs 310 and housing bearing surfaces 203 fully contact-engaged during relative articulating movement between shaft backlash surface 105 and housing backlash surface 202 requires sliding contact between shaft backlash surface 105 and Belleville washer 403, and pucks 404 and 404A respectively. Such sliding contact may lead to wear and/or loss of contact between shaft backlash surface 105 and Belleville washer 403, and pucks 404 and 404A respectively. Rolling contact between shaft backlash surface 105 and ball 423 on FIGS. 9G and 9H remediates any such concerns brought on by corresponding sliding contact in other backlash energizer embodiments.

It will be understood that the scope of this disclosure is not limited to the backlash energizer designs described above. The scope of this disclosure is not limited to any specific backlash energizer embodiment or configuration thereof. Some embodiments may provide no backlash energizer at all, or a hybrid including backlash energizers in some locations and not others. Some embodiments may further provide hybrids in which different backlash energizer designs are mixed on one housing assembly, or over two housing assemblies (upper and lower). Such embodiments providing mixed configurations may also include hybrid embodiments in which no backlash energizer is provided at selected locations.

Alternative TTE Embodiments

Figure 5A:
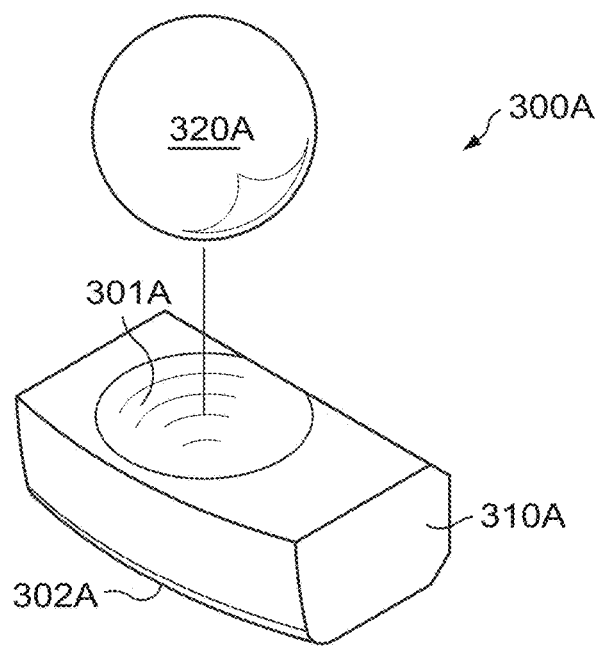
FIG. 5A illustrates TTE assembly 300A, which for reference is the same TTE embodiment as TTE assembly 300 depicted on FIGS. 3A and 6.
Figure 5B:
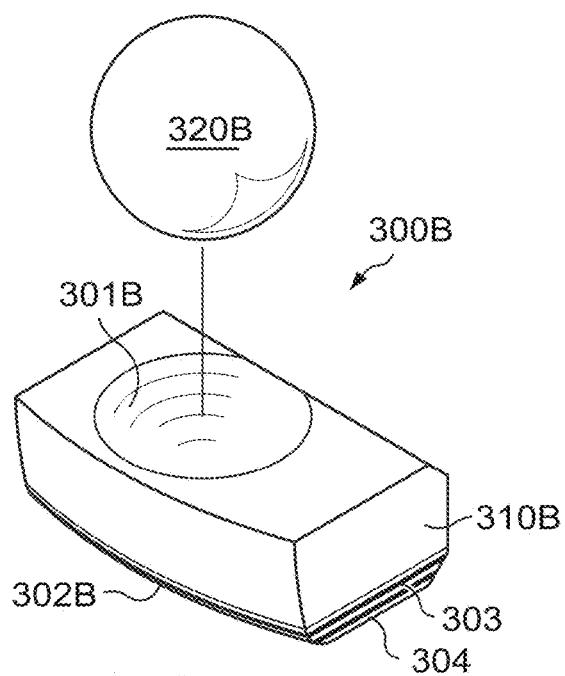
FIGS. 5B through 5G illustrate TTE assemblies 300B through 300G respectively (in which TTE assemblies 300B through 300G are alternative embodiments to TTE assembly 300A on FIG. 5A)
Figure 5C:
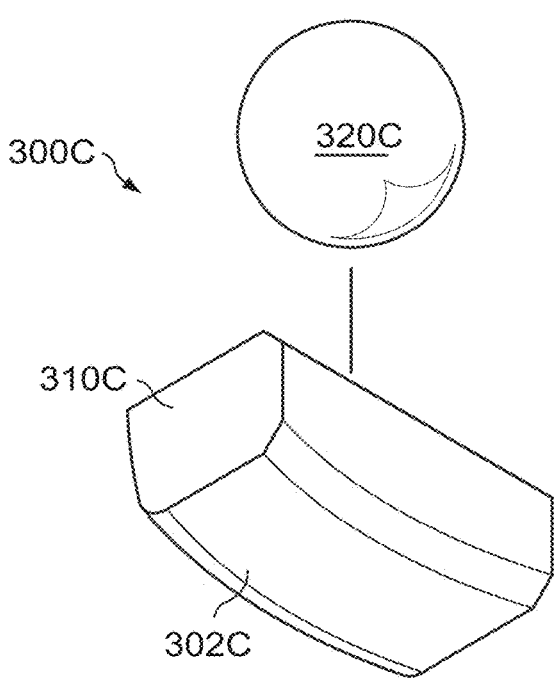
Figure 5D:
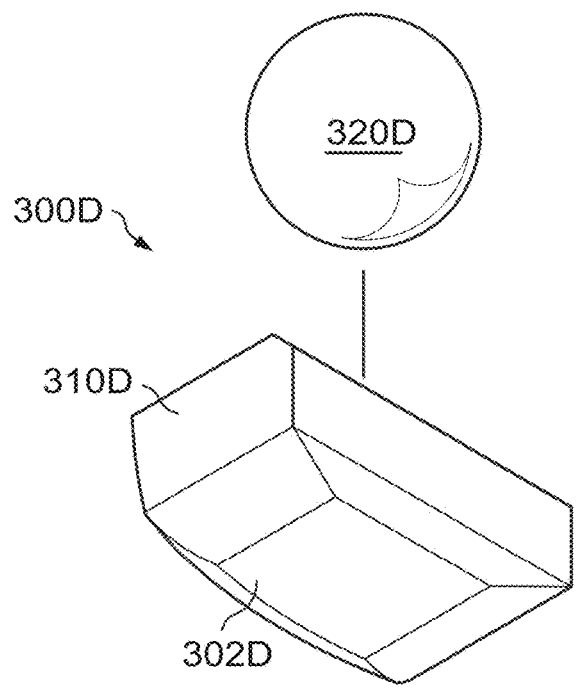
Figure 5E:
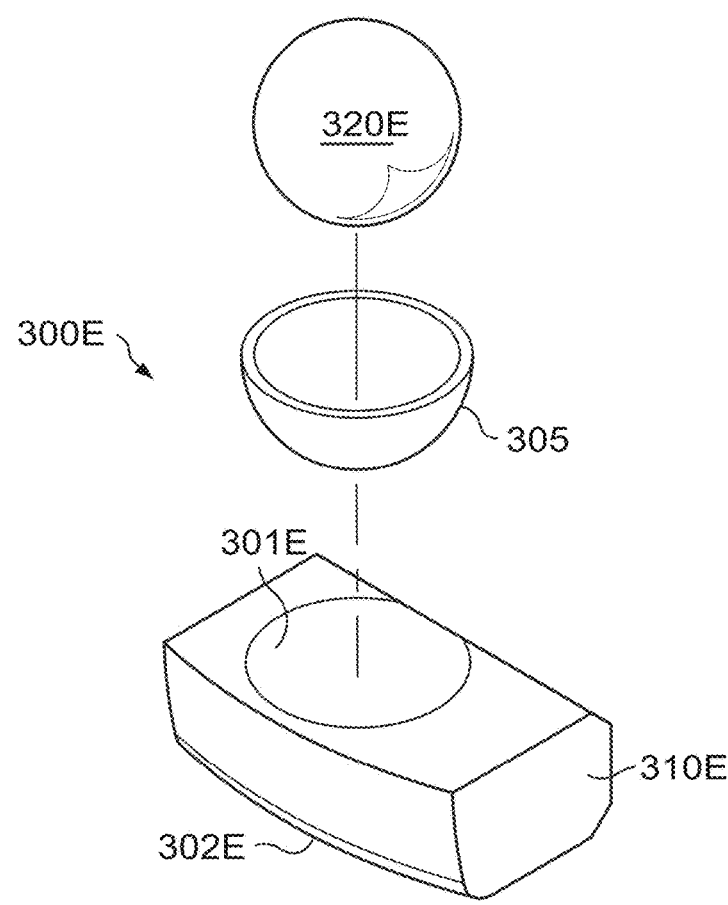
Figure 5F:
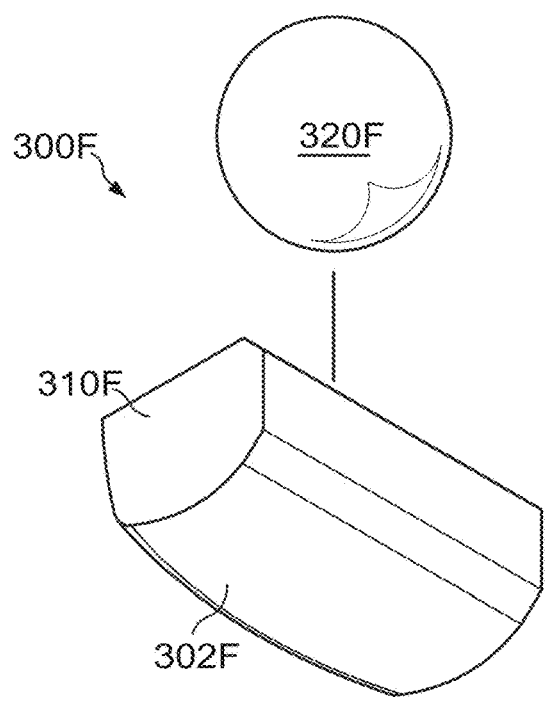
Figure 5G:
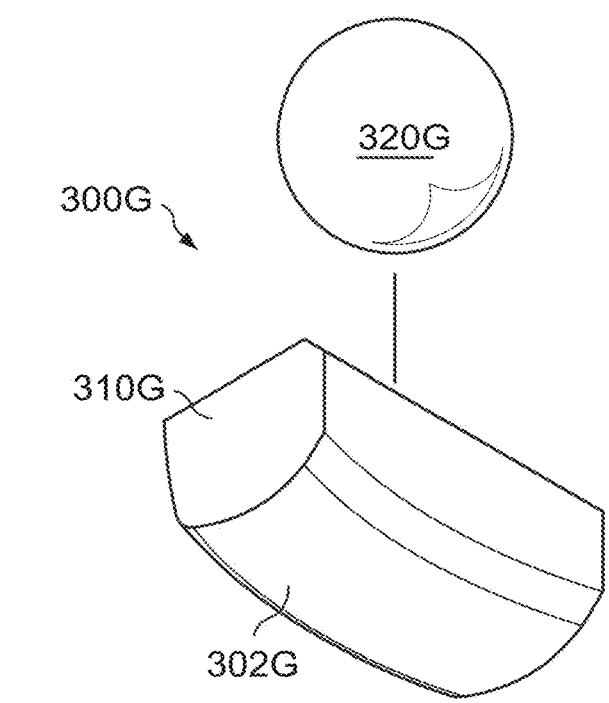
Figure 5H:
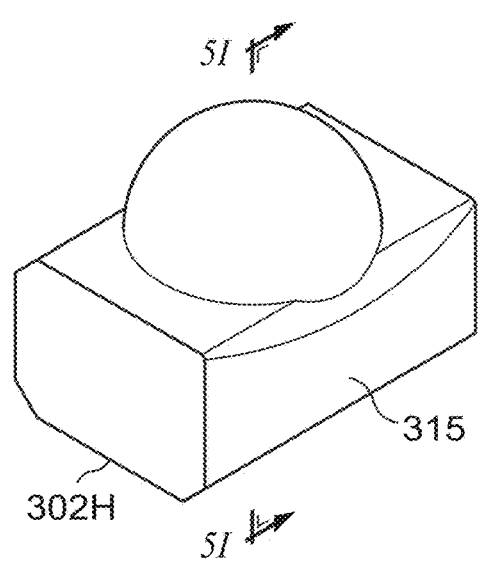
FIG. 5H illustrates unitary TTE 315 as an alternative embodiment to TTE assembly 300A on FIG. 5A.
Figure 5I:
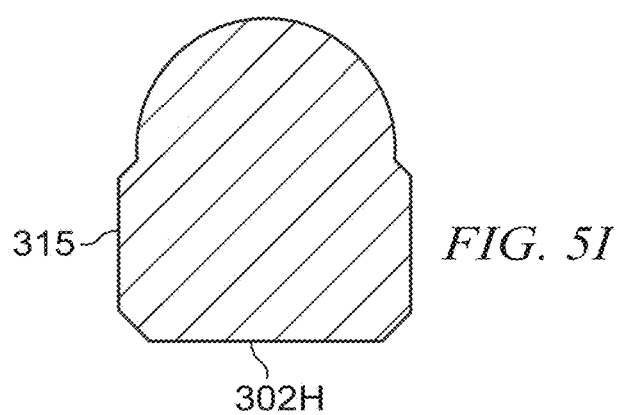
FIG. 5I is a section as shown on FIG. 5H.
Figure 6:
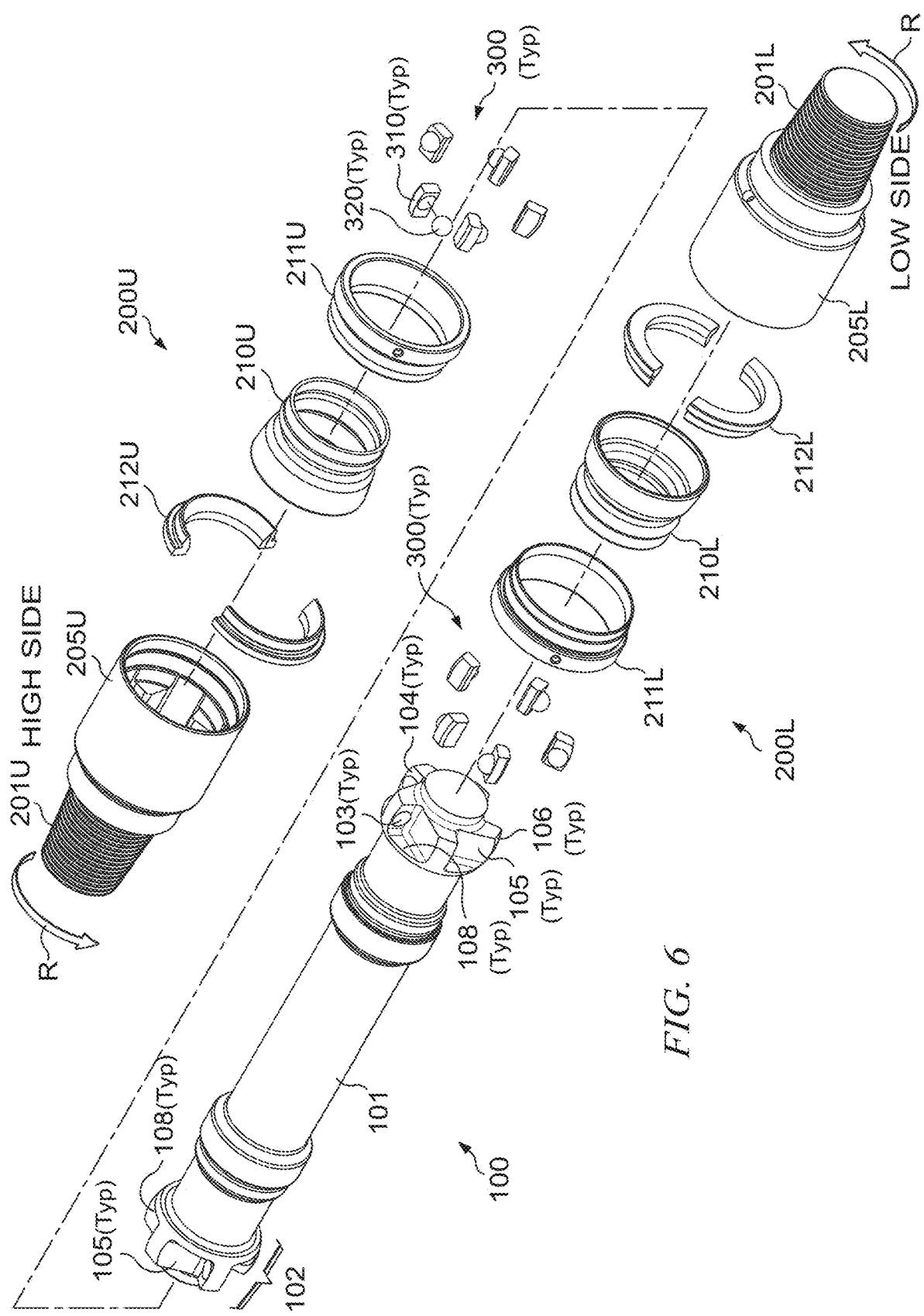
FIG. 6 is a fully exploded view of the transmission embodiment shown on FIG. 3A.

FIGS. 5A through 5I illustrate various alternative Torque Transfer Element ("TTE") embodiments. Earlier disclosure identified TTE assemblies 300 included in the illustrated embodiments of upper and lower housing assemblies 200U, 200L on FIGS. 3A, 4A, 4B and 6. FIG. 5A illustrates TTE assembly 300A, which for reference is the same TTE embodiment as TTE assembly 300 depicted on FIGS. 3A, 4A, 4B and 6. FIGS. 5B through 5G illustrate TTE assemblies 300B through 300G respectively. TTE assemblies 300B through 300G are alternative embodiments to TTE assembly 300A on FIG. 5A. FIG. 5H illustrates unitary TTE 315 as an alternative embodiment to TTE assembly 300A on FIG. 5A, and FIG. 5I is a section as shown on FIG. 5H.

Referring now to FIG. 5A, TTE assembly 300A includes TTE 310A and ball 320A, which correspond to TTE 310 and ball 320 on TTE assembly 300 on FIGS. 3A, 4A, 4B and 6. TTE 310A on FIG. 5A includes TTE recess 301A and TTE bearing surface 302A, which correspond to TTE recess 301 and TTE bearing surface 302 on TTE assembly 300 on FIGS. 3A, 4A, 4B and 6.

Referring now to FIG. 5B, TTE assembly 300B includes TTE 310B and ball 320B. TTE assembly 300B on FIG. 5B is an alternative embodiment to TTE assembly 300A on FIG. 5A. TTE 310B on FIG. 5B includes TTE recess 301B and laminated TTE bearing surface 302B. Bearing surface 302B on FIG. 5B includes a laminate for opposing contact with housing bearing surface 203 (refer FIG. 4B, for example), in which the laminate preferably includes alternating TTE elastomer layers 303 and metal layers 304. The laminate, however, may be of any suitable materials. The scope of this disclosure is not limited in this regard. The scope of this disclosure is further not limited to the design of laminate, including as to number of layers and their thicknesses. TTE assembly 300B on FIG. 5B, with its laminated bearing surface 203, enables resilient contact with housing bearing surface 203 with some compression bias. With further reference to FIG. 4B, such compression bias assists with keeping shaft wings 106, balls 320B, TTEs 310B and housing bearing surfaces 203 fully engaged by continuous contact during both normal torque transfer periods and torque backlash events. In particular, and referring momentarily to FIG. 4A, it will be understood that compression bias from TTE assemblies 300B may retain shaft wings 106, balls 320B, TTEs 310B and housing bearing surfaces 203 together during misaligned rotation.

Referring now to FIGS. 5C, 5F and 5G together, TTE assemblies 300C, 300F, 300G each include TTEs 310C, 310F, 310G and balls 320C, 320F and 320G respectively. TTE assemblies 300C, 300F and 300G are further alternative embodiments to TTE assembly 300A on FIG. 5A. TTEs assemblies 310C, 310F and 310G on FIGS. 5C, 5F and 5G each include TTE bearing surfaces 302C, 302F and 302G respectively. TTE bearing surfaces 302C, 302F and 302G each differ from TTE bearing surface 302A on FIG. 5A in that they have curvature, whereas TTE bearing surface 302A on FIG. 5A is substantially planar. TTE bearing surface 302C on FIG. 5C is curved in a longitudinal transmission assembly direction as superposed on FIG. 3A, for example, TTE bearing surface 302F on FIG. 5F is curved in a transverse direction, and TTE bearing surface 302G on FIG. 5G is curved in both longitudinal and transverse directions. With momentary reference to FIGS. 4A and 4B, curvature on TTE bearing surfaces 302C, 302F and 302G further assists with continuous contact between housing bearing surfaces 203 and TTE bearing surfaces 302C, 302F and 302G during misaligned rotation.

Referring now to FIG. 5D, TTE assembly 300D includes TTE 310D and ball 320D. TTE assembly 300D on FIG. 5D is a further alternative embodiment to TTE assembly 300A on FIG. 5A. TTE 310D on FIG. 5D includes TTE bearing surface 302D. TTE bearing surface 302D on FIG. 5D differs from TTE bearing surface 302A on FIG. 5A in that TTE bearing surface 302D includes angled faces at the periphery, whereas TTE bearing surface 302A on FIG. 5A is substantially planar. Embodiments according to FIG. 5D are useful to provide clearance at the edges of bearing surface 302D in limited space deployments where the corners of TTE 310D might interfere with corners in housing receptacle 207 (refer to FIG. 4B, for example).

Referring now to FIG. 5E, TTE assembly 300E includes TTE 310E and ball 320E. TTE assembly 300E on FIG. 5E is a further alternative embodiment to TTE assembly 300A on FIG. 5A. TTE 310E on FIG. 5E includes TTE recess 301E and TTE bearing surface 302E. TTE recess 301E on FIG. 5E differs from TTE recess 301A on FIG. 5A in that TTE recess 301E provides internal hard facing 305. (It will be understood that internal hard facing 305 is actually integral with TTE recess 301E although illustrated as a separate item for clarity). an angled face, whereas TTE bearing surface 302A on FIG. 5A is substantially planar. It will be recalled that ball/CV designs consistent with this disclosure call for rotation and tilt of TTEs around corresponding balls. It will be further appreciated that internal hard facing 305 on TTE recesses 301E, per FIG. 5E, reduces contact wear on TTE recesses 301E during such rotation and tilt between balls 320E and TTE recesses 301E. Since TTEs 310E are potentially more expensive and harder to manufacture/acquire than balls 320E, hard facing 305 on TTE recesses 301E allows balls 320E to become sacrificial during service life.

Figure 4C:
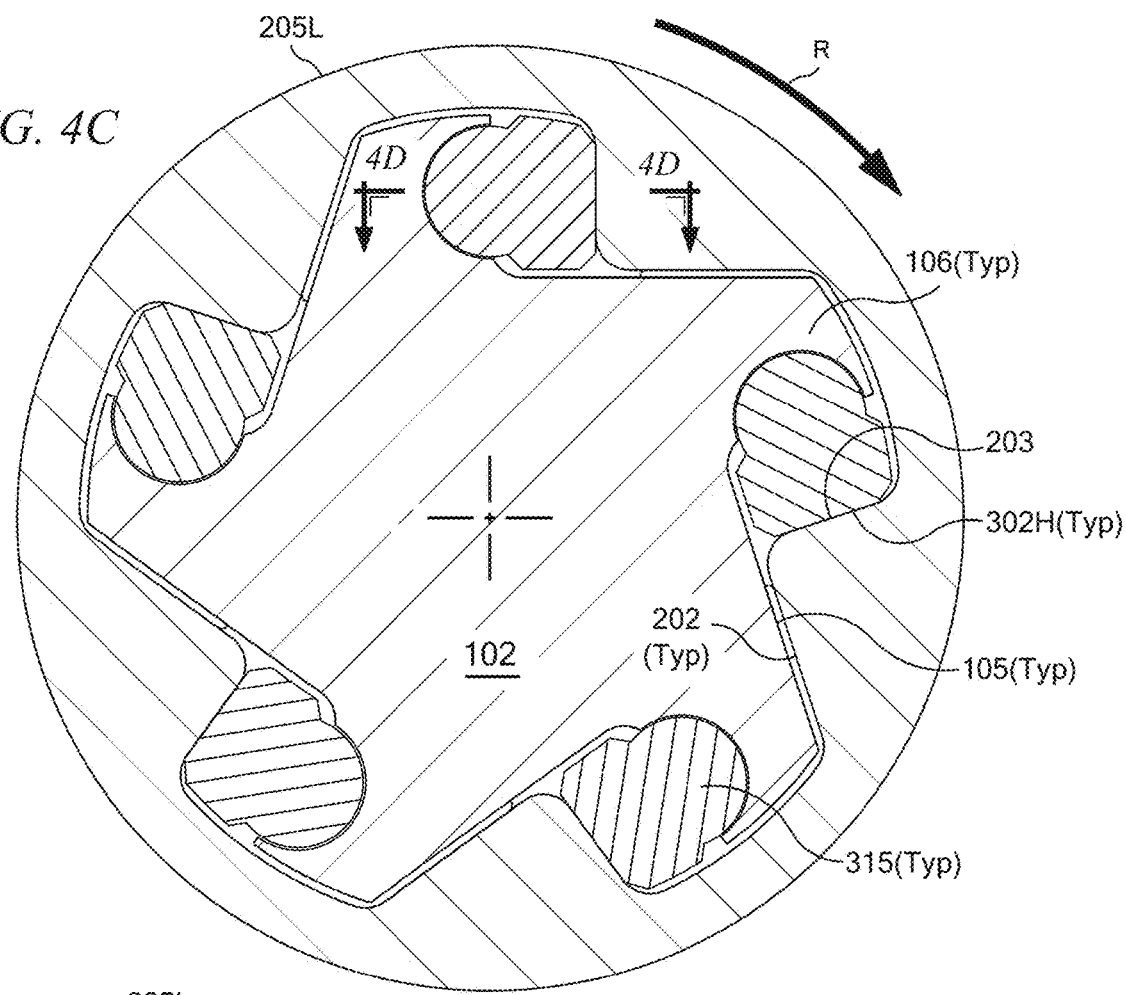
FIG. 4C depicts an alternative transmission embodiment including unitary TTEs 315 similar to those depicted on FIGS. 5H and 5I.
Figure 4D:
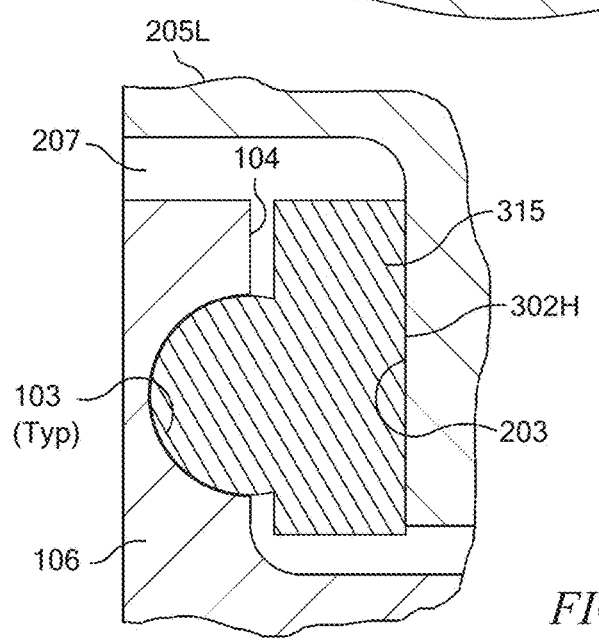
FIG. 4D is a section as shown on FIG. 4C.

Referring now to FIGS. 5H and 5I, FIG. 5H illustrates unitary TTE (or "UTTE") 315 as an alternative embodiment to TTE assembly 300A on FIG. 5A, and FIG. 5I is a section as shown on FIG. 5H. Unitary TTE 315 on FIGS. 5H and 5I include TTE bearing surface 302H. Unitary TTE 315 on FIGS. 5H and 5I differs from TTE assembly 300A on FIG. 5A in that the one-piece construction of unitary TTE 315 eliminates the need for a separate TTE 310A and ball 320A as in the embodiment of FIG. 5A. It will be noted from earlier description that by interposing a ball between TTEs and shaft wings, ball/CV designs consistent with this disclosure allow the TTE an additional degree of freedom to rotate and tilt relative to the shaft wings during articulation. In embodiments such as on FIG. 5A, the additional freedom to rotate and tilt manifests itself primarily by sliding movement between the TTE and the ball. However, in the embodiment of FIG. 5H, the additional freedom to rotate and tilt is forced into sliding movement between the ball and the shaft wing. Forcing the sliding movement to be between ball and shaft wing may be desirable in some applications. An first example of such an alternative unitary TTE (or "UTTE") transmission embodiment is illustrated on FIGS. 4C and 4D, and a second example is illustrated on FIGS. 12C and 12D. FIGS. 4C and 12C each depict respective exemplary transmission embodiments including unitary TTEs 315 similar to those depicted on FIGS. 5H and 5I. FIG. 4D is a section as shown on FIG. 4C, and FIG. 12D is a section as shown on FIG. 12C. Comparing FIG. 4C to FIG. 4A, UTTEs 315 on FIG. 4C substitute for balls 320 and TTEs 310 on FIG. 4A. FIGS. 4A and 4B show shaft wings 106 engaged with balls 320 and TTEs 310 in housing receptacles 207. In contrast, FIGS. 4C and 4D show shaft wings 106 engaged with UTTEs 315 in housing receptacles 207. FIG. 4C illustrates torque transfer in a clockwise direction in the following sequence (A) through (B): (A) from shaft wings 106 on shaft head 102 into UTTEs 315; and then (B) through UTTEs 315 and into lower housing 205L via housing bearing surfaces 203. Such clockwise torque transfer on FIG. 4C is consistent with clockwise rotation direction R as shown on FIG. 4C. FIGS. 4C and 4D further illustrate that during such clockwise torque transfer, UTTE bearing surface 302H bears upon housing bearing surface 203. FIG. 4D also shows that during such clockwise torque transfer, shaft recesses 103 formed in shaft bearing surfaces 104 bear upon UTTEs 315. Now comparing FIG. 12C to FIG. 12A, UTTEs 315 on FIG. 12C substitute for balls 320 and TTEs 310 on FIG. 12A. FIGS. 12A and 12B show shaft wings 1106 engaged with balls 320 and TTEs 310 in housing receptacles 1207. In contrast, FIGS. 12C and 12D show shaft wings 1106 engaged with UTTEs 315 in housing receptacles 1207. FIG. 12C illustrates torque transfer in a clockwise direction in the following sequence (A) through (B): (A) from shaft wings 1106 on shaft head 1102 into UTTEs 315; and then (B) through UTTEs 315 and into lower housing 1205L via housing recesses 1203 formed in housing bearing surfaces 1204. Such clockwise torque transfer on FIG. 12C is consistent with clockwise rotation direction R as shown on FIG. 12C. FIGS. 12C and 12D further illustrate that during such clockwise torque transfer, shaft bearing surface 1104 bears upon UTTE bearing surface 302H. FIG. 12D also shows that during such clockwise torque transfer, UTTEs 315 bear upon housing recesses 1203 formed in housing bearing surfaces 1204.

FIGS. 8A and 8B illustrate yet further TTE embodiments. FIG. 8A is a section similar to FIG. 4A, except depicting Bellville TTE assembly 330 as a further alternative embodiment to TTE assembly 300A as shown on FIG. 5A, for example. FIG. 8B is an exploded view of Belleville TTE assembly 330. Belleville TTE assembly 330 on FIGS. 8A and 8B differs from TTE assembly 300A on FIG. 5A in that bearing cup 331 and Belleville washer 332 on Belleville TTE assembly 330 are substituted in for TTE 310A on TTE assembly 300A. The combination of bearing cup 331 and Belleville washer 332 give Belleville TTE assembly 330 on FIGS. 8A and 8B an added compression bias. Similar to TTE assembly 300B on FIG. 5B, such compression bias in Belleville TTE assembly 330 assists with keeping shaft wings 106, balls 320, bearing cups 331, Belleville washers 332 and housing bearing surfaces 203 on FIG. 8A fully engaged by continuous contact during both normal torque transfer periods and torque backlash events. In particular, it will be understood that compression bias from Belleville TTE assemblies 330 may retain shaft wings 106, balls 320, bearing cups 331, Belleville washers 332 and housing bearing surfaces 203 together during misaligned rotation.

Figure 11:
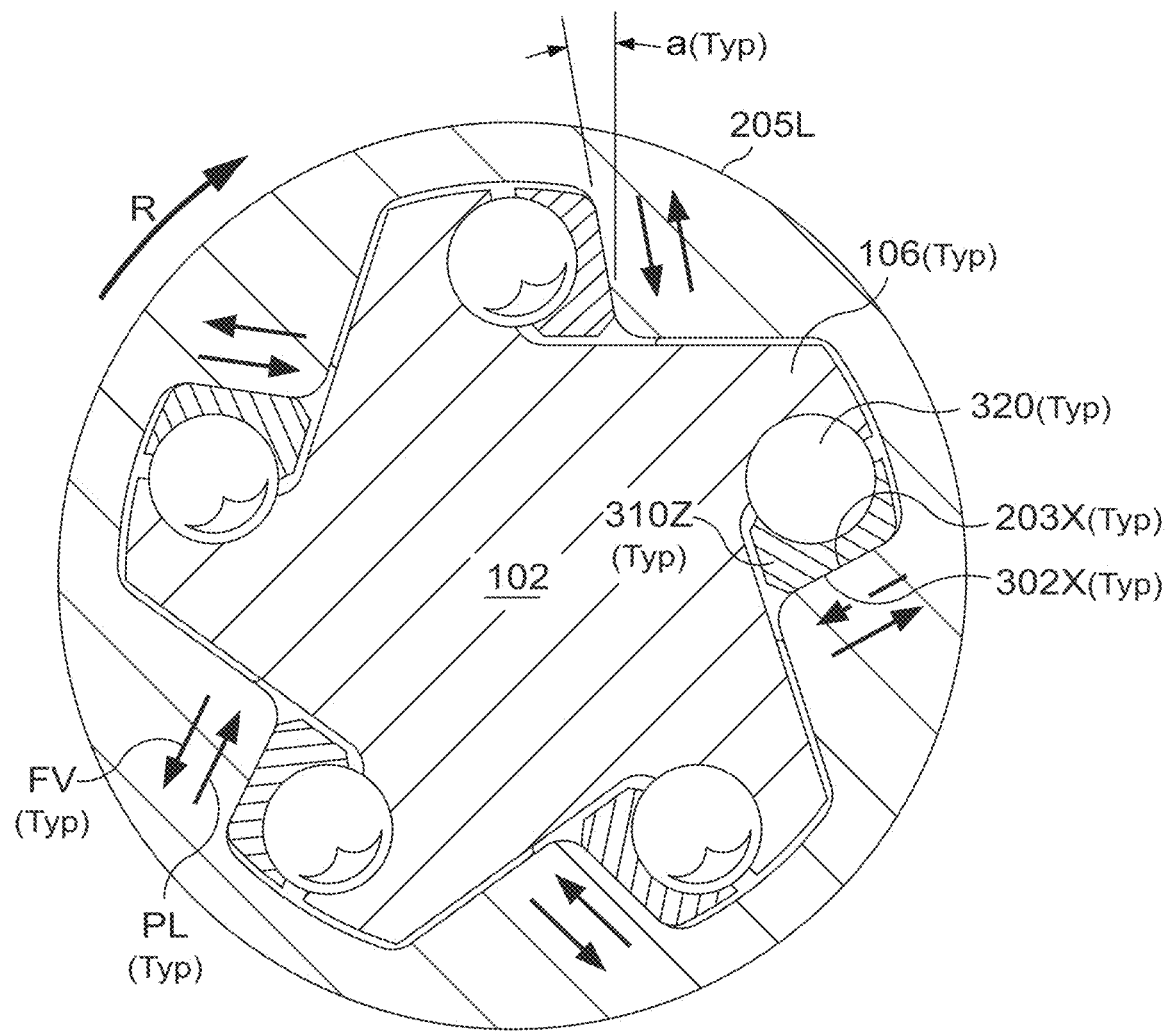
FIG. 11 is a section similar to FIG. 4A, except depicting an alternative "angled" TTE embodiment 310Z bearing upon corresponding "angled" housing bearing surface 203X.

FIG. 11 is a section similar to FIG. 4A, except depicting an alternative "angled" TTE embodiment 310Z bearing upon corresponding "angled" housing bearing surface 203X. Comparing FIG. 4A with FIG. 11, the illustrated details remain unchanged (including engagement of balls 320 with corresponding shaft wings 106), except that angled TTEs 310Z on FIG. 11 are substituted for TTEs 310 on FIG. 4A. Angled TTEs 310Z on FIG. 11 each include TTE bearing surfaces 302X each sloping at a user-selected angle Alpha ($\alpha$) as shown on FIG. 11. Lower housing 205L on FIG. 11 further provides housing bearing surfaces 203X each sloping at the user-selected angle Alpha ($\alpha$) to match TTE bearing surfaces 302X.

The angled TTE embodiment of FIG. 11 addresses radial vibration issues known to arise during articulated rotation. Especially at higher rotation speeds and torques, radial force vectors FV (as shown on FIG. 11) arise and tend to cause radial instability among the TTE assembly components. This radial instability often manifests itself as radial vibration in and around the TTE assemblies. Such radial vibration may increase wear among TTE assembly components and at the interface of contact surfaces. Further, referring momentarily to FIGS. 3B and 3C, such radial vibration may also increase wear on hard facing 209 (or a thrust bearing in non-illustrated embodiments).

FIG. 11 illustrates angled TTEs 310Z, with corresponding angled TTE bearing surfaces 302X and angled shaft bearing surfaces 203X, creating "ramps" with a slope bias preload force vector PL as also shown on FIG. 11. It will be seen on FIG. 11 that these bias preload force vectors PL tend to counteract radial force vectors FV. As a result, radial vibration is discouraged, particularly in an embodiment such as illustrated on FIG. 11 where multiple angled TTEs 310Z may act cooperatively to counteract radial force vectors FV arising around the entire housing periphery during articulated rotation. The scope of this disclosure is not limited, however, to providing angled TTEs 310Z around an entire housing periphery as depicted in FIG. 11. Non-illustrated embodiments may provide fewer angled TTEs 310Z in combination with other designs.

It will be understood that the scope of this disclosure is not limited to the various TTE designs described above. The scope of this disclosure is not limited to any specific TTE embodiment or configuration thereof. Some embodiments may provide hybrids in which different TTE designs are mixed on one housing assembly, or over two housing assemblies (upper and lower). Further, TTE designs as described above may be combined into single TTE embodiments (such as, for example, combining the hard facing embodiment of FIG. 5 with a curved TTE bearing surface embodiment selected from FIGS. 5C, 5F or 5G into one hybrid TTE embodiment).

Release Channel Embodiments

FIGS. 10A through 10D illustrate additional embodiments in which "release channels" may be provided either in shaft wings or in torque transfer elements ("TTEs"). In some embodiments, a release channel may enable use of a larger ball with the TTEs. Advantages of providing a larger ball have been described above. Briefly, a larger ball allows a larger contact area between ball and TTE, which in turn discourages wear, particularly the potential for cracking, galling and fretting. However, a larger ball, with its larger circumference, requires additional space to allow the TTE to rotate and tilt relative to the shaft wing in order to maintain mutual contact during articulated/misaligned rotation. Thus, in exemplary embodiments described below with reference to FIGS. 10A through 10D provide such additional space in the form of release channels. It should be noted that when the ball is in a release channel, a potential for point loads may arise between TTE and ball, or between shaft wing and ball as the ball moves along the release channel during articulation. However, in such point load situations, the potential for friction between TTE and ball, or between shaft wing and ball, also decreases in response to the reduced surface contact between components. Thus, with reduced friction, the TTE is able to rotate and tilt relative to the shaft wing with more freedom. The resulting trade-off may be desirable in selected applications and embodiments.

Figure 10A:
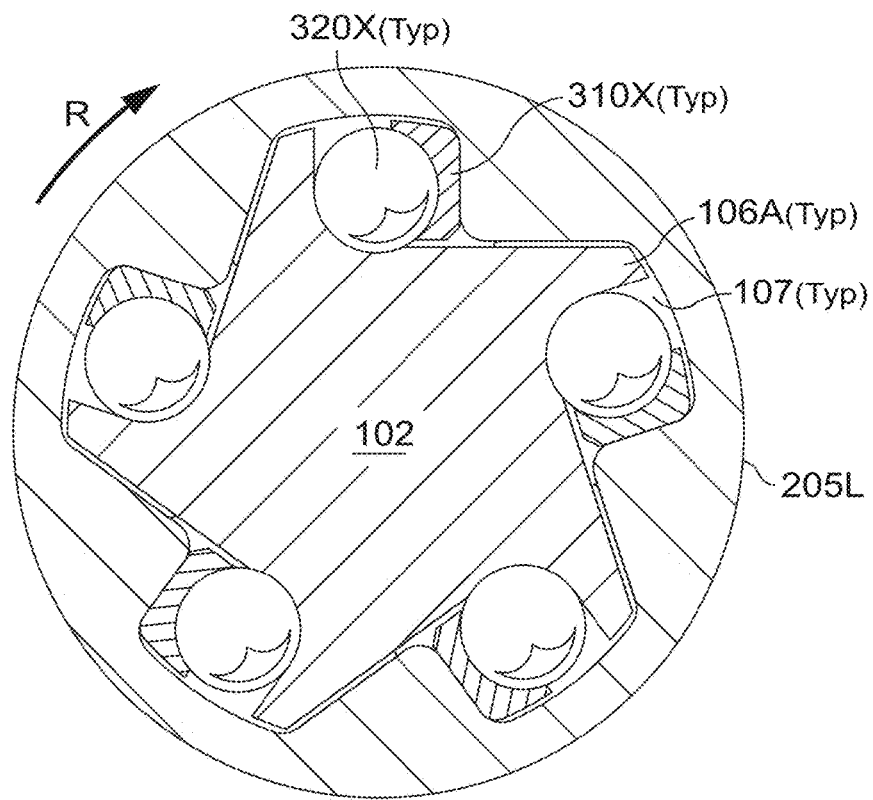
FIG. 10A is a section as shown on FIG. 10B.
Figure 10B:
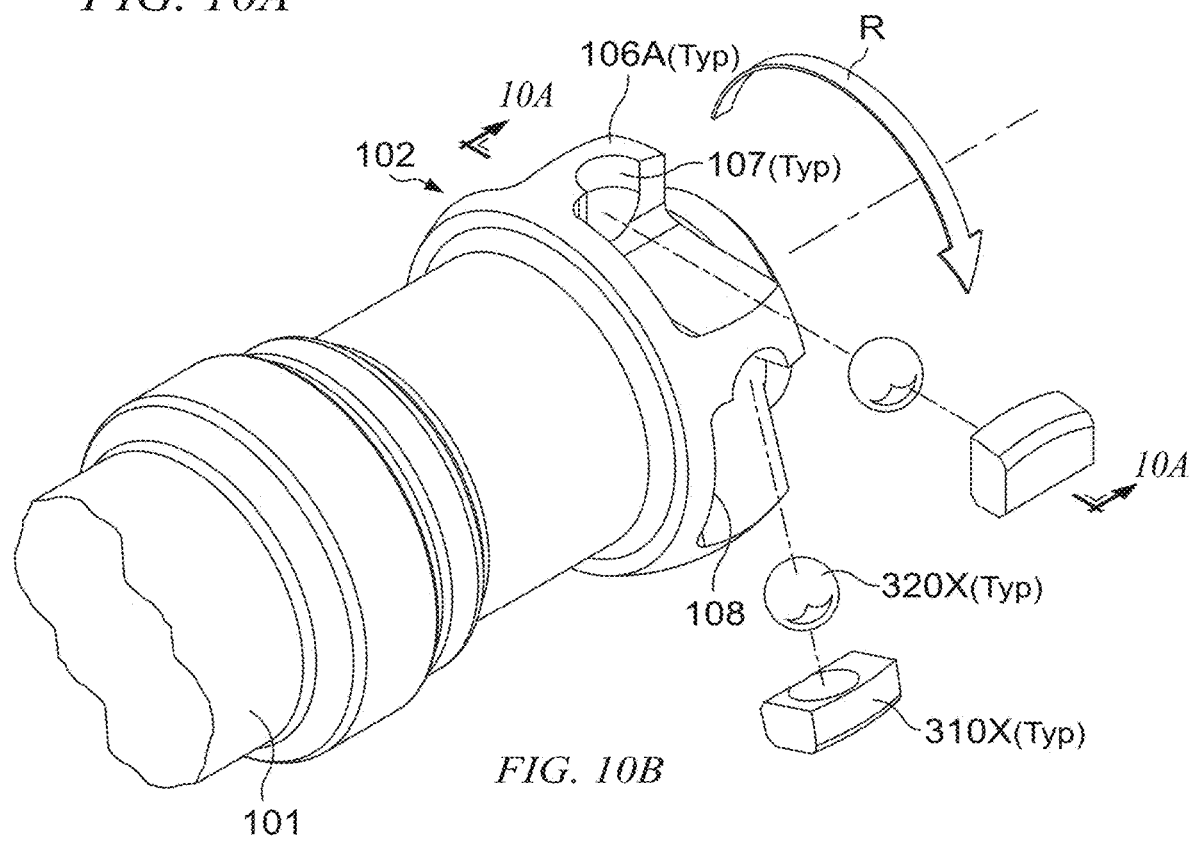
FIG. 10B illustrates an alternative embodiment of shaft head 102 in which shaft release channels 107 are provided in shaft wings 106A.

FIGS. 10A and 10B illustrate a release channel embodiment in which additional displacement space is afforded larger release channel balls 320X in shaft head 102. FIG. 10B depicts shaft head 102 in which shaft release channels 107 are provided in shaft wings 106A. FIG. 10A is a section as shown on FIG. 10B, and is analogous to FIG. 4A except depicting shaft release channels 107 and associated features.

Figure 10C:
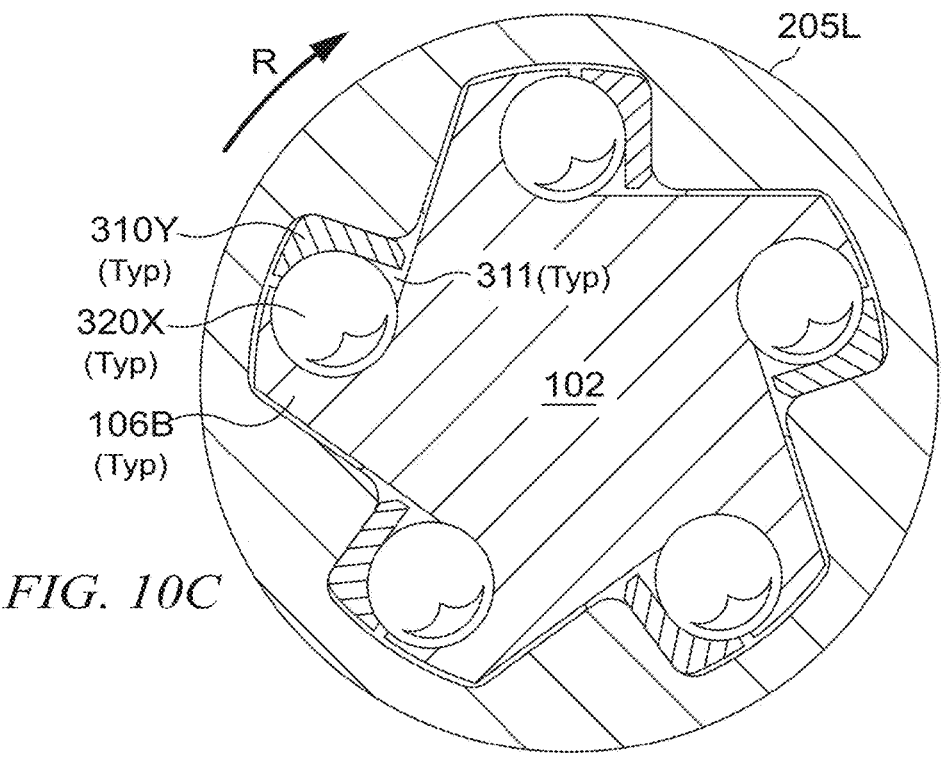
FIG. 10C is a section as shown on FIG. 10D.
Figure 10D:
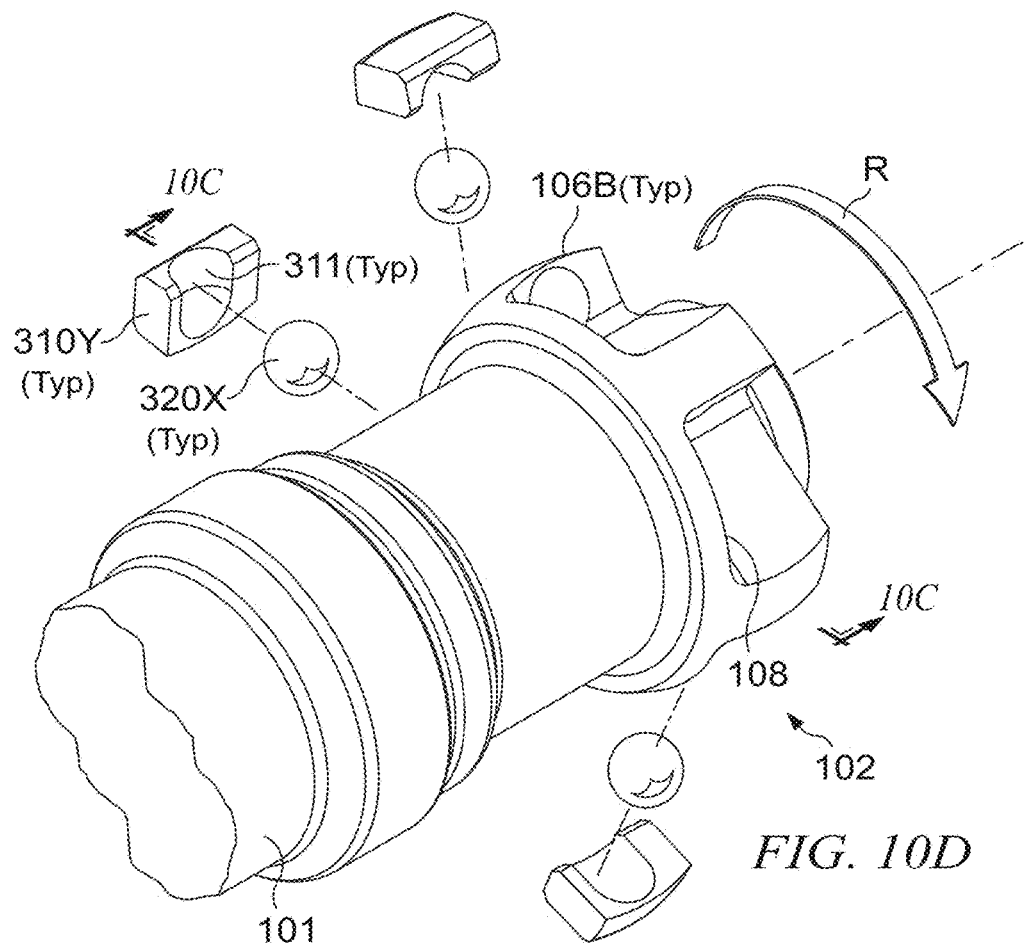
FIG. 10D illustrates a further alternative TTE embodiment in which TTE release channel 311 is provided in TTE embodiment 310Y.

FIGS. 10C and 10D illustrate another release channel embodiment in which additional displacement space is afforded larger release channel balls 320X in TTE 310Y. FIG. 10D depicts TTE release channel 311 provided in TTE 310Y. FIG. 10C is a section as shown on FIG. 10D, and is again analogous to FIG. 4A except depicting TTE release channel 311 and associated features.

Referring first to FIGS. 10A and 10B, shaft head 102 provides shaft wings 106A in which each shaft wing 106A includes a shaft release channel 107 in shaft recess 103 (refer to FIG. 4B for shaft recess 103, for example). Shaft release channels 107 are preferably curved in profile to match the circumference of larger release channel balls 320X, and extend radially to the outer periphery of shaft wings 106A in order to afford release channel balls 320X as much additional displacement space as may be available to maintain mutual contact with shaft wings 106A and TTEs 310X during articulated/misaligned rotation. TTEs 310X also provide larger TTE recesses therein to match the larger circumference of release channel balls 320X.

Referring now to FIGS. 10C and 10D, TTEs 310Y each include a TTE release channel 311. TTE release channels 311 are preferably curved in profile to match the circumference of larger release channel balls 320X, and extend radially inwardly towards shaft backlash surfaces 105 (refer to FIG. 4A for shaft backlash surfaces 105, for example). TTE release channels 311 thus afford release channel balls 320X as much additional displacement space as may be available to maintain mutual contact with shaft wings 106B and TTEs 310Y during articulated/misaligned rotation. Shaft wings 106B also provide larger shaft recesses therein to match the larger circumference of release channel balls 320X.

It will be understood that the scope of this disclosure is not limited to the release channel designs described above. The scope of this disclosure is not limited to any specific release channel embodiment or configuration thereof. Some embodiments may provide no release channel deployments at all, or a hybrid including release channels in some locations and not others. Some release channel embodiments may further provide hybrids in which different release channel designs are mixed on one housing assembly, or over two housing assemblies (upper and lower). Such release channel embodiments providing mixed configurations may also include hybrid embodiments in which no release channel is provided at selected locations. Some release channel embodiments may incorporate one or more TTE designs selected from the embodiments depicted on FIGS. 5A through 5I, 8A and 8B, or 11. Some release channel embodiments may provide "partial" release channels, in which, as the case may be: (A) shaft release channels 107 may not extend radially all the way to the outer periphery of shaft wings 106A; or (B) TTE release channels 311 may not extend radially inwardly all the way within TTEs 310Y to shaft backlash surfaces 105.

Although the inventive material in this disclosure has been described in detail along with some of its technical advantages, it will be understood that various changes, substitutions and alternations may be made to the detailed embodiments without departing from the broader spirit and scope of such inventive material, some embodiments of which are recited in the appended claims.

We claim:

1. An articulated transmission disposed to transmit torque via misaligned rotation, the transmission comprising:
a shaft having a shaft centerline about which the shaft is disposed to rotate, the shaft providing a plurality of shaft wings on one end thereof, the shaft wings extending generally radially from the shaft centerline;

each shaft wing providing a shaft bearing surface;

a generally cylindrical housing having a housing centerline about which the housing is disposed to rotate, the housing having a plurality of housing receptacles formed therein, each housing receptacle for receiving a corresponding shaft wing; and a plurality of unitary torque transfer elements (UTTEs), each UTTE providing a UTTE spherical surface and a planar UTTE bearing surface on opposite sides of the UTTE;

wherein each housing receptacle provides a housing bearing surface wherein a housing recess is formed in each housing bearing surface;

wherein a shaft wing and a UTTE are received into each housing receptacle such that within each housing receptacle, the UTTE spherical surface is received into the housing recess and the UTTE bearing surface opposes the shaft bearing surface;

wherein, responsive to misaligned rotation of the shaft centerline with respect to the housing centerline and regardless of angular deflection of the shaft centerline with respect to the housing centerline experienced within each housing receptacle during an articulated revolution of the shaft: (1) the UTTE bearing surfaces are free to slidably displace against corresponding shaft bearing surfaces; (2) the housing recesses restrain the UTTEs from movement in at least a radial direction with respect to the housing centerline; and (3) the UTTEs are free to tilt within the housing recesses.

2. The transmission of claim 1, in which the UTTEs float at least generally radially with respect to the shaft centerline when the UTTE bearing surfaces slidably displace against corresponding shaft bearing surfaces.

3. The transmission of claim 1, in which:

each shaft wing further provides a shaft backlash surface such that each shaft bearing surface opposes a shaft backlash surface on a neighboring shaft wing;

each housing receptacle further provides a housing backlash surface to oppose a corresponding shaft backlash surface; and wherein the transmission further includes a backlash energizer assembly interposed between at least one opposing shaft backlash surface and housing backlash surface.

4. The transmission of claim 3, in which the backlash energizer assembly includes a puck separating a set screw and a backlash energizer Belleville washer.

5. The transmission of claim 3, in which the backlash energizer assembly includes a puck.

6. The transmission of claim 5, in which the puck includes a laminate of metal and elastomer layers.

7. The transmission of claim 1, in which at least one housing receptacle further includes a housing release channel, and in which housing release channels extend housing recesses such that UTTE spherical surfaces may float within housing release channels responsive to said misaligned rotation of the shaft centerline with respect to the housing centerline.

* * * * *